(12) United States Patent
Manur et al.

(10) Patent No.: US 7,190,696 B1
(45) Date of Patent: Mar. 13, 2007

(54) SYSTEM AND METHOD FOR DISTRIBUTING PACKETS AMONG A PLURALITY OF PATHS TO A DESTINATION

(75) Inventors: Rajeev Manur, Sunnyvale, CA (US); Krishnamurthy Subramanian, Mountain View, CA (US); Tissa Senevirathne, Sunnyvale, CA (US)

(73) Assignee: Force10 Networks, Inc., San Jose, CA (US)

( * ) Notice: Subject to any disclaimer, the term of this patent is extended or adjusted under 35 U.S.C. 154(b) by 1032 days.

(21) Appl. No.: 10/092,198

(22) Filed: Mar. 5, 2002

(51) Int. Cl.
*H04L 12/28* (2006.01)
(52) U.S. Cl. ............... 370/392; 370/401; 709/238
(58) Field of Classification Search .......... None
See application file for complete search history.

(56) References Cited

U.S. PATENT DOCUMENTS

| | | | | |
|---|---|---|---|---|
| 5,394,393 A | * | 2/1995 | Brisson et al. | 370/392 |
| 5,566,170 A | * | 10/1996 | Bakke et al. | 370/392 |
| 6,192,051 B1 | * | 2/2001 | Lipman et al. | 370/389 |
| 6,567,382 B1 | * | 5/2003 | Cox | 370/255 |
| 6,643,287 B1 | * | 11/2003 | Callon et al. | 370/392 |
| 6,646,989 B1 | * | 11/2003 | Khotimsky et al. | 370/238 |
| 6,721,800 B1 | * | 4/2004 | Basso et al. | 709/239 |
| 6,888,838 B1 | * | 5/2005 | Ji et al. | 370/401 |
| 6,987,735 B2 | * | 1/2006 | Basso et al. | 370/409 |
| 7,009,987 B1 | * | 3/2006 | Matsuzawa et al. | 370/392 |
| 2002/0172203 A1 | * | 11/2002 | Ji et al. | 370/392 |
| 2003/0137978 A1 | * | 7/2003 | Kanetake | 370/386 |

* cited by examiner

*Primary Examiner*—Chau Nguyen
*Assistant Examiner*—Jordan Hamann
(74) *Attorney, Agent, or Firm*—Haynes and Boone, LLP

(57) ABSTRACT

A network-processor device comprises a packet-processor for an ingress port that is operative to distribute data flows to a plurality of equal-cost paths for transfer of data toward a given destination. The packet-processor also includes further distribution circuitry for designating a link of a link aggregation by which to channel the data between routers within a part of a selected path. Accordingly, each of the layer distributions—i.e., amongst the higher-level equal-cost-paths and amongst the lower-level link aggregation—are capable of being coordinated by a common, generic packet-processor.

72 Claims, 17 Drawing Sheets

| INDEX 139 | FIELD 3 141 | FIELD 2 139 | | FIELD 1 143 | |
|---|---|---|---|---|---|
| PNTR 1 | EN̄ | MSB | LSB | EGRESS PORT 1 | ⎫ |
| PNTR 2 | EN̄ | | | EGRESS PORT 2 | ⎬ 153 |
| ⋮ | ⋮ | | | ⋮ | ⎭ |
| PNTR 3 | EN | 0 | LAG ID 1 | | ⎫ |
| PNTR 4 | EN | 0 | LAG ID 2 | | ⎬ 155 |
| ⋮ | ⋮ | ⋮ | ⋮ | | ⎭ |
| PNTR 5 | EN | ≥ 512 | NH PNTR 1 | | ⎫ |
| PNTR 6 | EN | ≥ 512 | NH PNTR 2 | | ⎬ 157 |
| ⋮ | ⋮ | ⋮ | | | ⎭ |

142B

| INDEX | FIELD 3 | \<-- FIELD 2 --\> SUB 1 | SUB 2 | SUB 3 | SUB 4 | SUB 5 | SUB 6 | SUB 7 | SUB 8 | FIELD 1 |
|---|---|---|---|---|---|---|---|---|---|---|
| PNTR 1 | CNT=0 | | | | | | | | | EGRESS PORT 1 |
| PNTR 2 | CNT=0 | | | | | | | | | EGRESS PORT 2 |
| PNTR 3 | CNT=0 | | | | | | | | | EGRESS PORT 3 |
| ... | ... | | | | | | | | | ... |
| PNTR 5 | CNT=1 | NHP 1 | | | | | | | | |
| PNTR 6 | CNT=1 | NHP 2 | | | | | | | | |
| ... | ... | | | | | | | | | |
| PNTR 7 | CNT=2 | NHP 1 | NHP 2 | | | | | | | |
| PNTR 8 | CNT=2 | NHP 3 | NHP 4 | | | | | | | |
| PNTR 9 | CNT=2 | NHP 1 | NHP X | | | | | | | |
| ... | ... | | | | ... | | | | | |
| PNTR 10 | CNT=8 | NHP 1 | NHP 2 | NHP 3 | NHP 4 | NHP 5 | NHP 6 | NHP 7 | NHP 8 | |
| PNTR 11 | CNT=8 | NHP A | NHP B | NHP C | NHP D | NHP E | NHP F | NHP X | NHP Y | |
| ... | ... | | | | | | | | | |

FIG. 10B

| 142E INDEX | 350 FIELD 3 | 348 FIELD 2 | 346 FIELD 1 ↙ | | | | | | | |
|---|---|---|---|---|---|---|---|---|---|---|
| | | | 340 ⏞ EGRESS PORT | | 342 ⏞ | 344 ⏞ | | | | |
| | | | | SUB1 | SUB2 | SUB3 | SUB4 | SUB5 | SUB6 | SUB7 | SUB8 |
| POINTER 1 | 1CNT = 0 | SRAMLAG EN = 0 | EGRESS PORT 1 | | | | | | | | |
| POINTER 2 | 1CNT = 0 | SRAMLAG EN = 0 | EGRESS PORT 2 | | | | | | | | |
| POINTER 3 | 0 | 0 | EGRESS PORT 3 | | | | | | | | |
| ••• | ••• | ••• | ••• | | | | | | | | |
| | = 0 | 1 | LAG ID = 1 | | | | | | | | |
| | = 0 | 1 | LAG ID = 2 | | | | | | | | |
| | ••• | ••• | ••• | | | | | | | | |
| | 1 | 0 | | NHP1 | | | | | | | |
| | 1 | 0 | | NHP2 | | | | | | | |
| | ••• | ••• | | ••• | | | | | | | |
| | 2 | 0 | | NHP1 | NHP1 | | | | | | |
| | 2 | 0 | | NHP2 | NHP2 | | | | | | |
| | ••• | ••• | | ••• | ••• | | | | | | |
| | | | | | | | | ••• | | | |
| | 8 | 0 | | NHP1 | NHP2 | NHP3 | NHP4 | NHP5 | NHP6 | NHP7 | NHP8 |
| | 8 | 0 | | NHPA | NHPC | NHPD | NHPE | NHPF | NHPF | NHPX | NHPY |
| | ••• | ••• | | ••• | ••• | ••• | ••• | ••• | ••• | ••• | ••• |

FIG. 16

SYSTEM AND METHOD FOR DISTRIBUTING PACKETS AMONG A PLURALITY OF PATHS TO A DESTINATION

BACKGROUND

The present invention relates to networks, data packet routers, and network processors, and, more particularly, to methods and apparatus for distributing data flows across a plurality of equal-cost paths of a network or distributing the data flows across a plurality of links of a link aggregation.

Exemplary, known networks comprise a plurality of network processors, routers, switches and gateways (or other such exemplary network processing device) to effect delivery of data from a source point to a destination point. Such a network-processing device receives data at one or more ingress-ports, determines an egress-port to forward the received data and routes the received data to identified egress-ports. The network processing device, thus, continues propagation of the received data through the network, and toward the destination point.

If a particular path or link of the networking device is utilized repetitively, then a data-bottleneck may form so as to limit or restrict data propagation through the network. Therefore, in order to keep data smoothly flowing through the network, it may be desirable to distribute the received data across multiple paths of the network to avoid data-bottlenecking. For a layer-3 environment and protocol, the received data should be distributed across a plurality of paths of equal-cost. Likewise, for layers of the network beneath layer-3, the data flows could be distributed across a plurality of links of a link aggregation. Such data path and link distributions can provide more efficient utilization of the bandwidth available to a network processing device.

SUMMARY

In accordance with exemplary embodiments of the present invention, a network-processing device comprises a packet processor operative to distribute data flows across a plurality of equal-cost paths. In accordance with further exemplary embodiments of the present invention, the packet processor can also distribute the data flows across a plurality of links of a link aggregation of the network processing device.

In accordance with another exemplary embodiment of the present invention, a network-processing device comprises a first table addressable by content information of received data to establish an index for indexing a second table. The second table comprises a plurality of output fields for sending data dependent upon the indexing provided by the first table. A multiplexer is operable to obtain information for a next-hop transfer for transfer of the received data by selecting from amongst the plurality of next-hop designations. The separate output fields of the second table originate at least two of the plurality of possible next-hop designations. In accordance with one aspect of the exemplary embodiment, the processor obtains the content information from a header of the received data and the first table comprises a content addressable memory.

In accordance with a further aspect of the exemplary embodiment, the second table is addressed by the output of the content addressable memory and establishes data for the separate fields dependent upon the indexing provided by the content addressable memory. A first output field of the plurality originates one of the plurality of next-hop designations while a second output field originates at least another of the next-hop designations.

In accordance with yet a further embodiment of the present invention, the network-processing device further comprises a third table having a plurality of selectable entries having next-hop data. The second output field of the output of the second table is used to index the third table and the output of the third table provides another of the plurality of available next-hop designations for selection by the multiplexer.

In still a further exemplary embodiment of the present invention, the second output field of the second table comprises at least two subportions and the network-processing device includes a second multiplexer to select one of the subportions for indexing the third table. In accordance with an alternative exemplary aspect of this embodiment, the second multiplexer makes its selection dependent upon a control signal established by a third output field of the second table.

In accordance with a further aspect of exemplary embodiments of the present invention, the second multiplexer selects from at least two subportions dependent upon a control signal and the network-processing device further comprises a modulo processor. The modulo processor establishes the control signal to the second multiplexer dependent upon a mob operation of a hash value acted upon by a count value. The count value is received from the third output field of the output of the second table output, and the hash value determined from header information of the received data. In accordance with a further aspect of this alternative exemplary embodiment, the second output field of the second table includes M subportions. The second table includes entries of a first plurality having count values of N for output to the third output field. The entries of the first plurality of the second table include values for a least N subportions of the M subportions.

In accordance with another embodiment of the present invention, a network-processing device comprises a first table having a plurality of selectable pointers and an output to present a selected pointer of the plurality. A second table is to be indexed by the select pointer of the first table and comprises a plurality of selectable entries to be output when designated by the pointer output of the first table. A link aggregation circuit defines a next-hop pointer based upon a first output of the second table. A next-hop table comprises a plurality of selectable entries having next-hop pointer IDs. A multiplexer addresses the next-hop table by selecting a next-hop pointer from one of the LAG circuit or a second output of the second table. In accordance with a further exemplary embodiment, the second table comprises a plurality of output fields including a control field. Entries of a first plurality within the second table include first data for the control field while entries of a second plurality include second data for the control field. The multiplexer that makes the pointer source selection, makes its selection dependent upon the value of the data in the control field output of the second table.

In accordance with a further exemplary embodiment of the present invention, the LAG circuit includes a LAG table that has a plurality of entries with LAG-size values that are indexed by respective LAG IDs. Each entry of the first plurality of the second table includes a pointer-field having a LAG-ID value for indexing the LAG table. The LAG table outputs a LAG-size value dependent upon the LAG-ID value provided by the pointer-field output of the second table. A distribution circuit determines an output value of magnitude up to the LAG-size value which can be combined with the pointer-field of the second table to establish and present a next-hop pointer to a selectable first input of the multiplexer. In still a further exemplary embodiment of the present invention, the distribution circuit includes a mod processor that provides one of either a mod or modulo operation of a hash value acted upon by a LAG-length value. Such LAG length is determined from the LAG-size output from the LAG table, and the hash value established from header information of data received by the network processing device. In accordance with still a further exemplary embodiment of the present invention, the second table comprises a SRAM device.

In accordance with other exemplary embodiments of the present invention, a multiple-link, network-processing device for routing data includes a data processor to receive data and determine content information of the received data. A content addressable memory comprises a plurality of entries that have pointers to be output dependent upon the content information determined by the data processor. The pointers, as output from the content addressable memory, index selectable entries of a second table for presentation upon a plurality of data output fields. One output field of the plurality comprises various subportions. At least a first plurality of the selectable entries of the second table include egress-port identifications for output to at least one subportion of the first output field. A multiplexer selects one of the subportions of the first output field of the second table to obtain an ID value for determining an egress port for transfer of the received data.

In accordance with further exemplary embodiments of the present invention, the second table comprises a second output field and at least a portion of the selectable entries of the second table provides a control value for presentation to the second output field for determining the multiplexer selection. Additionally, a next-hop table comprises a plurality of selectable entries that have port identifications for output when indexed by a matching pointer value of the multiplexer output.

In accordance with another exemplary embodiment of the present invention, a method of operating a multi-port network routing device includes determining a destination address associated with received data. A number of paths available for routing to the destination address is determined, and the received data transferred to select ones of the number of determined paths. The select ones to which the received data is transferred is determined by a distribution algorithm that distributes the path utilization over each of the available paths.

In accordance with a further exemplary embodiment, the distribution algorithm establishes the path selections dependent upon header information of the received data. In still a further exemplary embodiment, a forwarding-equivalent-class of the received data is determined, and data of the same forwarding-equivalent-class is transferred to the same, selected one of the available paths.

BRIEF DESCRIPTION OF THE DRAWINGS

The various exemplary embodiments of the present invention may be understood by reading the disclosure with reference to the accompanying drawings wherein:

FIG. 10B shows the contents of lookup table for the schematic diagram of FIG. 10A as associated with exemplary embodiments of the present invention.

FIG. 16 shows the contents of a lookup table for the schematic diagram of FIGS. 13 and 14.

DETAILED DESCRIPTION

As used herein, network-processing device and multi-link network-processing device depict types of packet-processing devices that can perform packet switching between its various ports within a network for delivery of packets from a source point to a destination point. Routers, switches, access concentrators, and gateways are common examples of packet processing devices.

A "packet-processing device" embodiment of the present invention is typically associated with each port of a given router.

"Header" refers to a portion of a packet or data flow that is used to assist propagation of data through a given network. Exemplary headers may include information fields of a given protocol—such as, for example, source address, protocol identification, error checking, etc. of an MPLS, IP switching, cell switching, tag switching or aggregate route-based IP switching protocol or the like. Alternatively, the header information could be of a known layer-2, routing procedure, such as, for example, of an Ethernet data flow.

Figure 1:
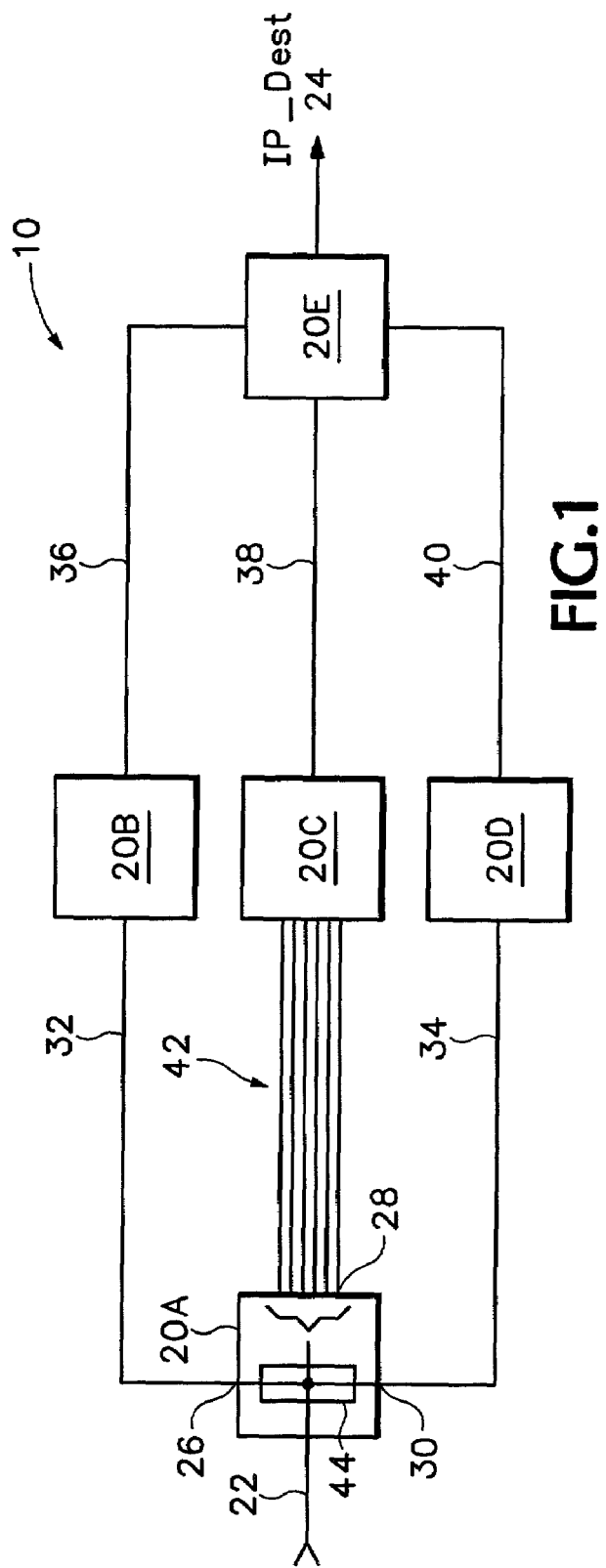
FIG. 1 is a simplified block diagram of a network comprising a plurality of network processing devices embodying packet processors as associated with exemplary embodiments of the present invention.

FIG. 1 shows a simplified, high-level block diagram that schematically illustrates network 10 as associated with exemplary embodiments of the present invention. Network routing devices 20A, 20B, 20C, 20D, 20E are coupled together via the exemplary paths 32, 34, 36, 38, 40, 42. For example, path 32 is coupled from port 26 of network device 20A to a port of network device 20B, and path 34 coupled from port 30 of network device 20A to a port of network device 20D. Similarly, path 36 is coupled between network devices 20B and 20E, path 38 between network devices 20C and 20E, and path 40 between network device 20D and 20E. Accordingly, a plurality of paths 32–36, or 42–38 or 34–40 are available for propagating data from a source 22 to destination 24.

Although only five of the network processing devices 20 and six paths are shown for the exemplary network 10 of FIG. 1, it is understood that alternative, exemplary embodiments may employ various number of processing devices, paths, ports and/or link aggregations.

Continuing with further reference to FIG. 1, assume that source ingress port 22 of network routing device 20A receives input data that specifies routing to destination 24. A packet processor 44, in accordance with an exemplary embodiment of the present invention, will receive the data and determine a plurality of paths of equal costs that may be used for routing the data toward destination 24. The packet processor 44 of network-routing device 20A then determines one of egress ports 26, 28 and 30 by which to transfer the received data for continued propagation through network 10. Additionally, in accordance with further exemplary embodiments of the present invention, packet processor 44 further designates a link of link aggregation 28 to use for propagation of data to router 20C. Although not shown, router 20A might also include additional input ports and packet processor devices by which to receive, process and distribute the data.

Figure 2:
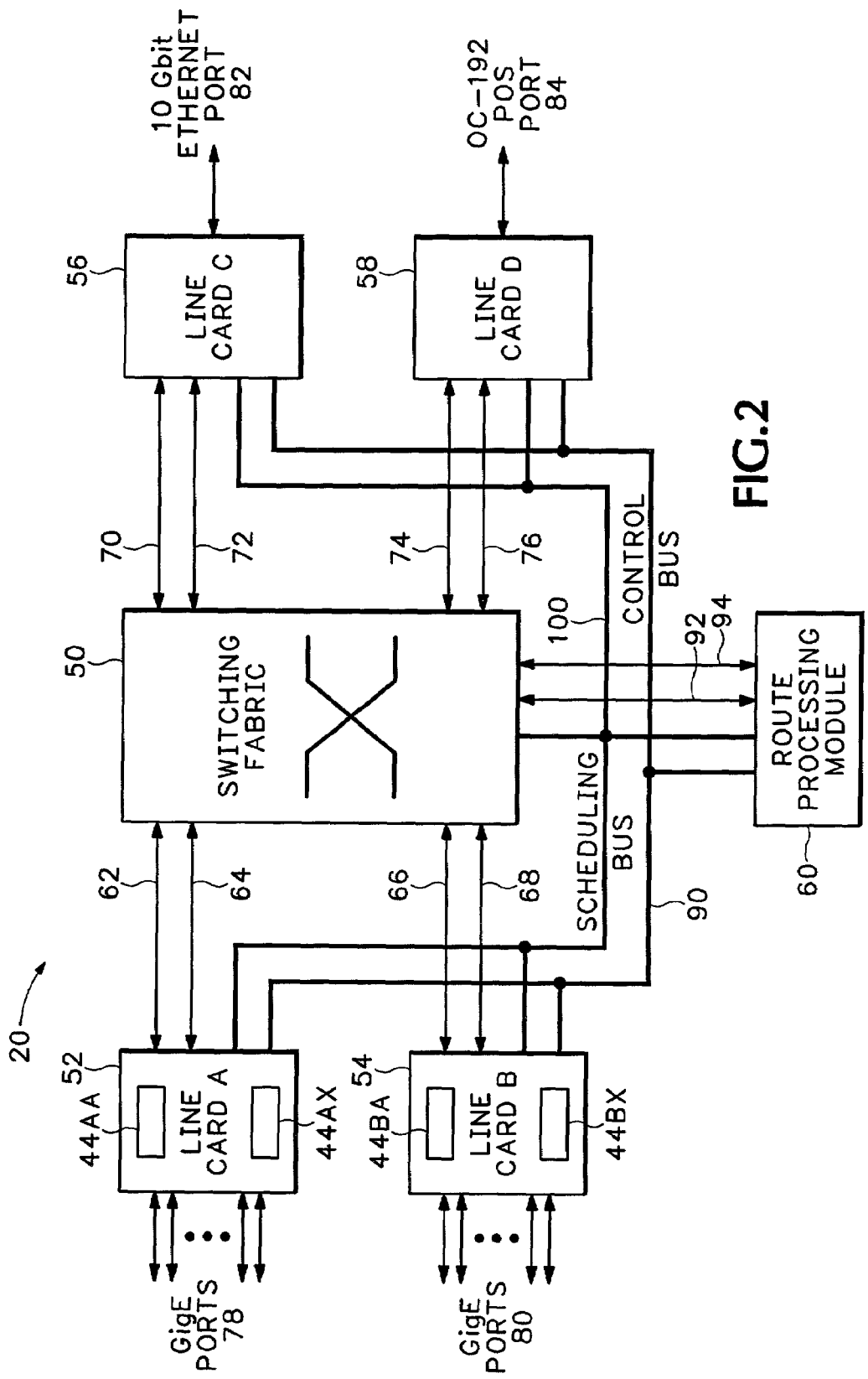
FIG. 2 is a simplified block diagram of a network-processing device associated with exemplary embodiments of the present invention.

Referencing FIG. 2, in simplified, high-level block diagram overview, a network routing device 20 comprises packet processors 44xx to interface various parts of the router as associated with exemplary embodiments of the present invention. Line cards 52, 54, 56 and 58 provide physical ports 78, 80, 82 and 84 of the routing device 20, with line card 52, for example, providing up to 24 gigabit Ethernet ports 78 and line card 54 providing similar capabilities. Line card 56 includes two 10 gigabit Ethernet ports 82, while line card 58 provides an OC-192 POS (packet-over-SONET) port 84. Although the four line cards are shown, many systems provide slots to accommodate additional cards, for example, of up to 14 line cards in a particular exemplary embodiment. Accordingly, a user can configure routing device 20 to accommodate different traffic models and physical port mixes by appropriate selection of line cards and programming.

Switching-fabric 50 moves each data packet from an ingress port of a line card to an egress port of a line card. Switching-fabric 50 connects to each line card through two switching-fabric port connections (see, for example, port connections 62, 64 to line card 52, port connections 66, 68 to line card 54, port connections 70, 72 to line card 56, and port connections 74, 76 to line card 58). Switching-fabric 50 can be rapidly reconfigured. For example, at one instant, it may be switching packets from ingress port 68 to egress port 70 and at another instant from ingress port 64 to egress port 76, and at the next instant, it could be switching packets from ingress port 62 to egress port 66. At the same time, packets from ingress port 70 could be routed to egress port 68, and packets from ingress port 74 could be routed to egress port 62.

Route-processing module 60 has several duties. For one, it is responsible for overall system operation, such as recognizing and booting new line cards, identifying faulty line cards, packet route discovery, and sharing routing-table information with the line cards. In addition, by way of a user interface, it allows a user to configure the system and to view system parameters. For each of these functions, route-processing module communicates with the line cards over a control bus 90.

Another duty of route-processing module 60 is to schedule the switching-fabric 50. In accordance with an exemplary implementation, switching-fabric 50 is reconfigured by the route-processing module 60 for each epic over a series of epics, where an epic is a selected time interval. Route-processing module 60 uses scheduling bus 100 to communicate to switching-fabric 50 and also to line cards 52, 54, 56, 58 when configuring the switching-fabric for each epic. Route-processing module 60 will schedule as many ports as possible for each epic to ensure that data is handled promptly.

Route-processing module 60 also maintains its own switching-fabric port connections 92, 94 that allow it to receive and transmit packets via any of the line card physical ports. In accordance with exemplary embodiments of the present invention, packet processors 44AA through 44AX, of line card 52 and packet processors 44BA through 44BX of line card 54, each handle data as received from their designated port and determine which of the available egress ports of routing device 20 will be used for transfer of their received data.

Figure 3:
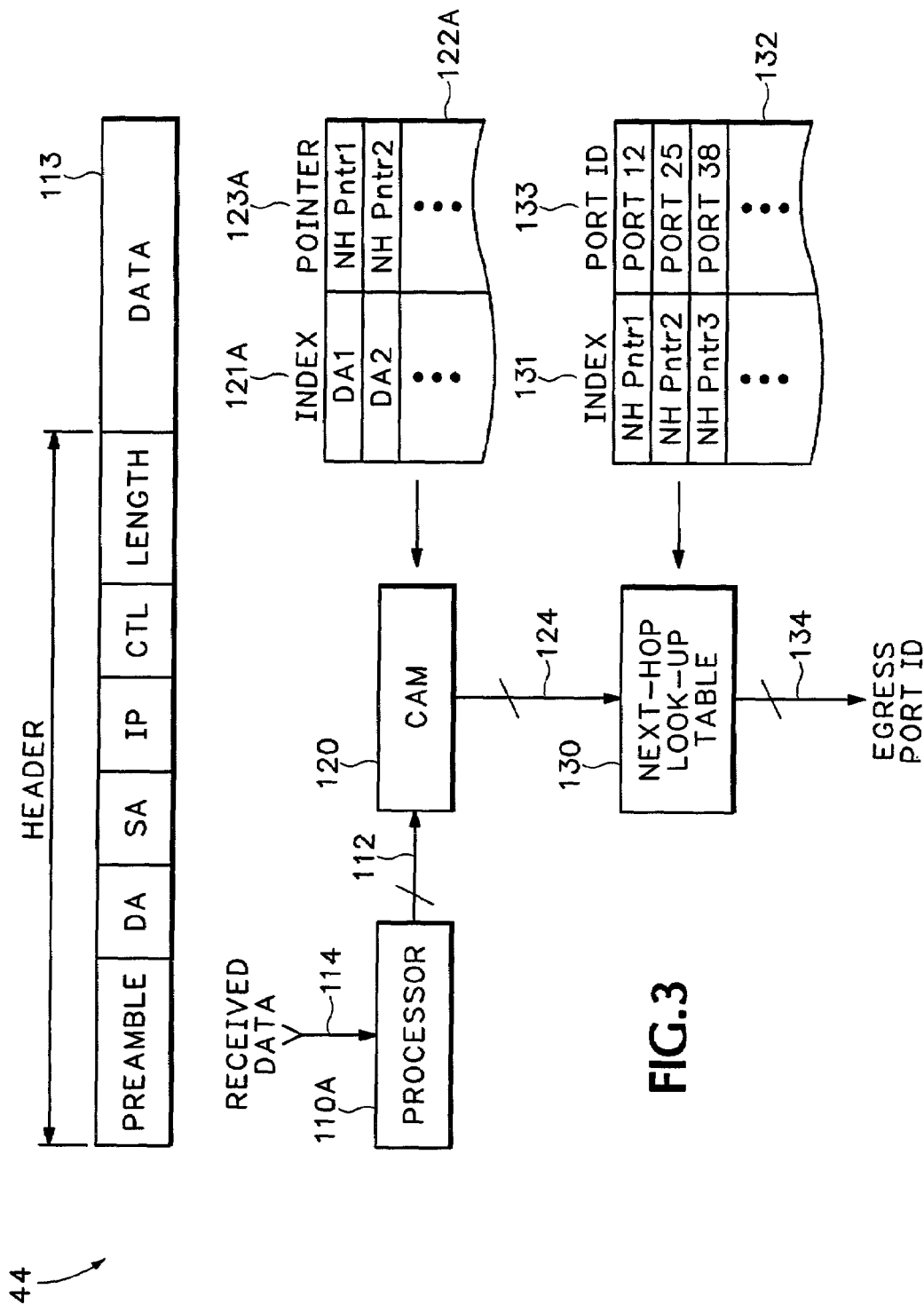
FIG. 3 is a partial, simplified block diagram of a network processor or packet processor showing packet-forwarding circuitry associated with exemplary embodiments of the present invention.
Figure 4:
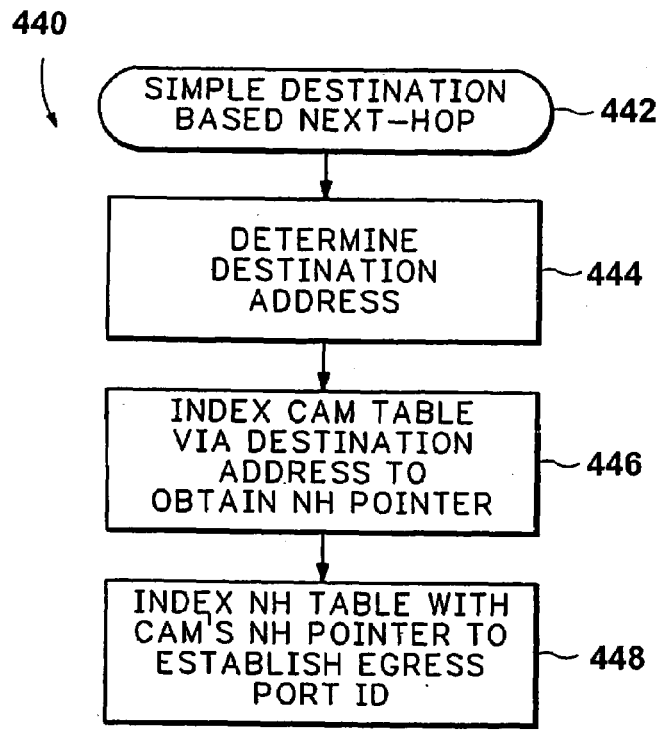
FIG. 4 is a simplified flow chart illustrating a method of operating a network processor in accordance with exemplary embodiments of the present invention.

Referencing FIGS. 3–4, an exemplary packet processor 44 for designating or identifying egress ports includes processor 110A to receive data 113 at its input 114. Packet processor 44 uses a simple destination based next-hop method 442, shown in flowchart 440 of FIG. 4, to establish an egress port ID for a packet. Processor 110A determines 444 a destination address DA from the header of the received data and uses the destination address 112 as a basis to index 446 content addressable memory (CAM) 120. Upon matching an index 121A of its table 122A, content addressable memory 120 will output next-hop pointer 123A at its pointer output 124. The next-hop pointer output indexes 448 next-hop table 130, which comprises a lookup table 132, having a plurality of port identifications 133 selectably indexed by respective next-hop pointers 131. Upon establishing a pointer match to a particular index 131 therein, the next-hop table 130 outputs an egress port identification 133 at its output 134.

Not shown, but understood to be encompassed within the exemplary embodiments described above relative to FIGS. 3–4, another external processor or controller (such as route-processing module 60 of FIG. 1) configures the CAM tables 122 of the packet processors 44 with the next-hop pointer values 123 that are capable of being referenced by respective index values 121. Additionally, each of their next-hop tables 130 will have been previously configured with entries 132, comprising the plurality of egress port IDs 133 indexed by respective index or pointer values 131.

Further describing the data transfer, upon determining an identified egress port, the data can then be encapsulated, labeled, packaged or otherwise processed according to the Internet Protocol procedure of the packet processor's environment and then forwarded to the identified egress port. For example, in accordance with an MPLS protocol, the input data can be encapsulated with MPLS labels or an existing label of the received data is replaced with a new label.

Returning briefly to FIG. 1, assume that the packet processor 44 for port 22 of router 20A has its CAM 120 (FIG. 3) programmed with a next-hop pointer value 123A that is indexed by an index 121A corresponding to the address of destination 24. With such correspondence, data that is received having the address of destination 24 will thereby be sent to an egress port, for example, egress port 30 of network-processing device 20A, for transfer of its received data. Thereafter, each time CAM 120 receives data of the same destination address, it will retrieve the same pointer value 123A for indexing next-hop table 130 and determines the same egress port identification, for example, egress port 30.

Figure 6:
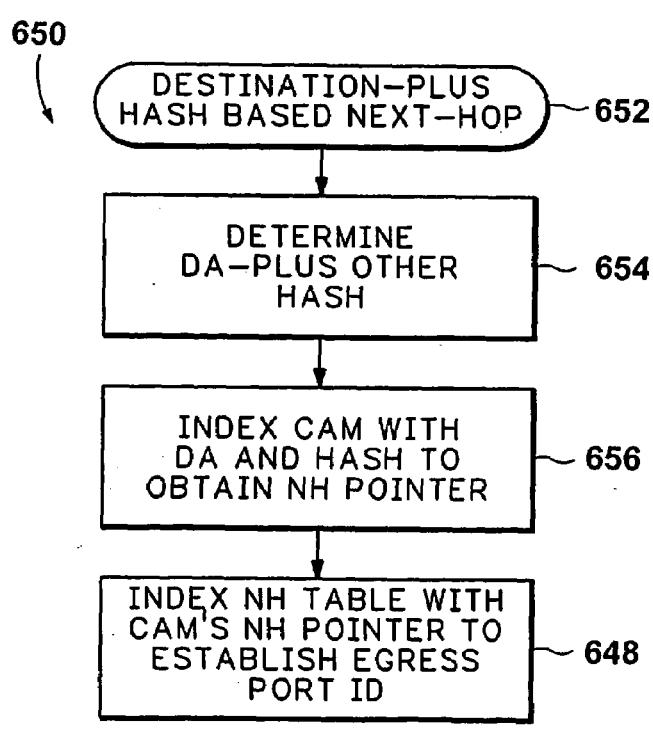
FIG. 6 is a simplified flow chart illustrating an exemplary method of operating a network or router processor in accordance with exemplary embodiments of the present invention, in which hash information derived from a packet header is used to index a content addressable memory in determining an egress port for transfer of data.
Figure 5:
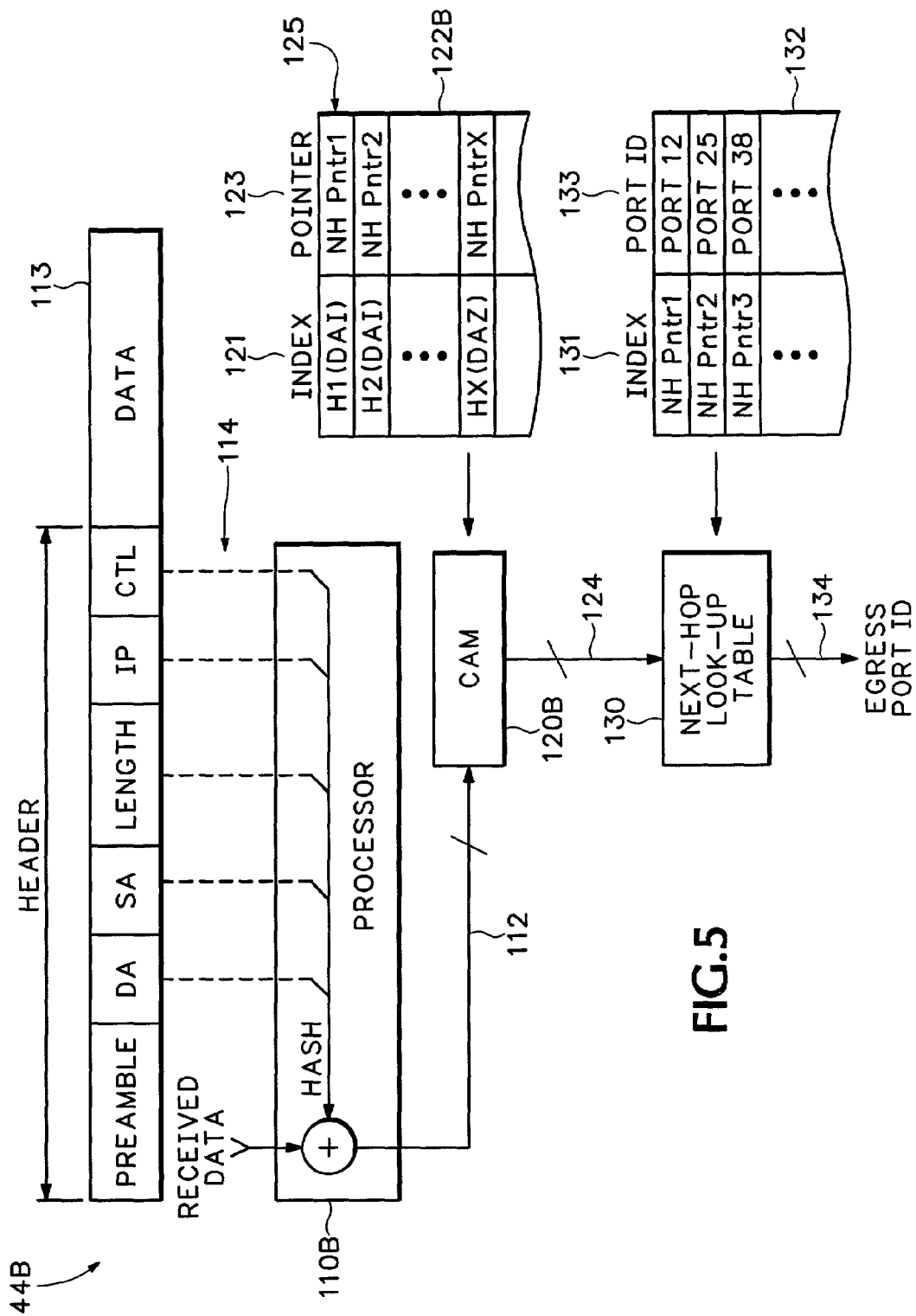
FIG. 5 is a simplified block diagram of a network or packet processor associated with further exemplary embodiments of the present invention, in which header information is used to index a content addressable memory to establish pointers for a next-hop forwarding table.

Referencing FIGS. 5–6, in accordance with an exemplary embodiment of the present invention, a plurality of equal cost paths interface respective plurality of egress ports 26, 28 and 30 of the network-processing device 20A for distributing data flows from ingress port 22 to destination 24. A processor 110B of packet processor 44B obtains HASH information from a header of a received data packet 113. Packet processor 44B uses a destination-plus-hash based next-hop method 652, shown in flowchart 650 of FIG. 6, to establish an egress port ID for a packet. For example, the additional HASH information can be obtained from various portions of the header, such as, destination address, source address, data length, IP protocol, control information, preamble, or other equivalent regions per an IP protocol. According to a particular exemplary embodiment, a destination address is determined and then combined with the additional hash information 654 to provide an index 112 for indexing 656 a content addressable memory (CAM) 120B.

CAM 120B is programmed as lookup table 122B having a plurality of entries 125. The entries include next-hop pointer values 123 indexed by respective index values 121. Distinguishing the CAM table 122A of FIG. 3, table 122B of the present exemplary embodiment includes multiple next-hop pointers 123 that are associated with a common destination address, for example, DA1; yet, the separate entries are further distinguishable per the additional hash information. With processor 110B deriving index values 112 from both the destination address and the additional hash information as obtained from the header of the received data 113 and with CAM table 122B further configured with the additional next-hop pointers per destination address, the packet processor is able to distribute the data flows across a plurality of paths via the egress ports established by configuration table 122B, even though the flows may be destined for the same destination address.

As similarly noted before, the pointer 124 output from CAM 120B is used to index 648 next-hop table 130 to match an index value 131 of its lookup table 132. Upon finding an index match, next-hop table 130 presents an egress port identification 133 at its output 134. Using this output 134 of the packet processor 44B, a router 20 (referencing FIGS. 1 and 2) is able to transfer the received data to the identified egress port. Again, data-handling circuitry of the router can package, encapsulate or switch labels of the received data with appropriate new labels per its IP environment.

Not shown, although implied, with reference to preceding FIGS. 5 and 6, in accordance with particular embodiments of the present invention, data processor 110B includes IP protocol circuits that determine a forwarding equivalent class (FEC) or Quality of Service (QS) for groups of data or data flows. Upon determining the FEC or QoS, data of the same flow is kept with the same selected path or link as established by the packet processor 44B.

Additionally, an external processor, for example, route-processing module 60 of router 20 with reference to FIGS. 2 and 5 will configure or program CAM 120B of packet processor 44B with entries 125 having next-hop pointers 123 associated with index values 121 that can be established from various destination addresses, for example, DA1, and HASH values previously determined to be associated with the ports to known equal-cost paths. Likewise, next-hop table 132 will have been previously programmed with port identifications and associated index values 133, 131 respectively. With the HASH-based indexing of the particular exemplary embodiments of the present invention, multiple flows that are destined to a given destination can be distributed across a plurality of previously determined equal-cost paths.

Returning with reference to FIG. 1, if a single link between two network processing devices, for example, routers 20A and 20C of a network 10, is limited to a 500 MHz bandwidth rate, yet there exists a need to obtain a 2 GHz bandwidth communication through-put, then a plurality of aggregated links 42 can be configured between the two networking devices to enable a higher bandwidth communication rate. In accordance with an exemplary embodiment of the present invention, the aggregated links are operated as a single logical link that is interfaced by "port" 28 between the two routers. Additionally, in accordance with a further exemplary embodiment of the present invention, separate data transfer applications between the two network processing devices 20A,20C are distributed across the various links of the link aggregation 42 such that the links are used substantially uniformly over time.

Figure 7:
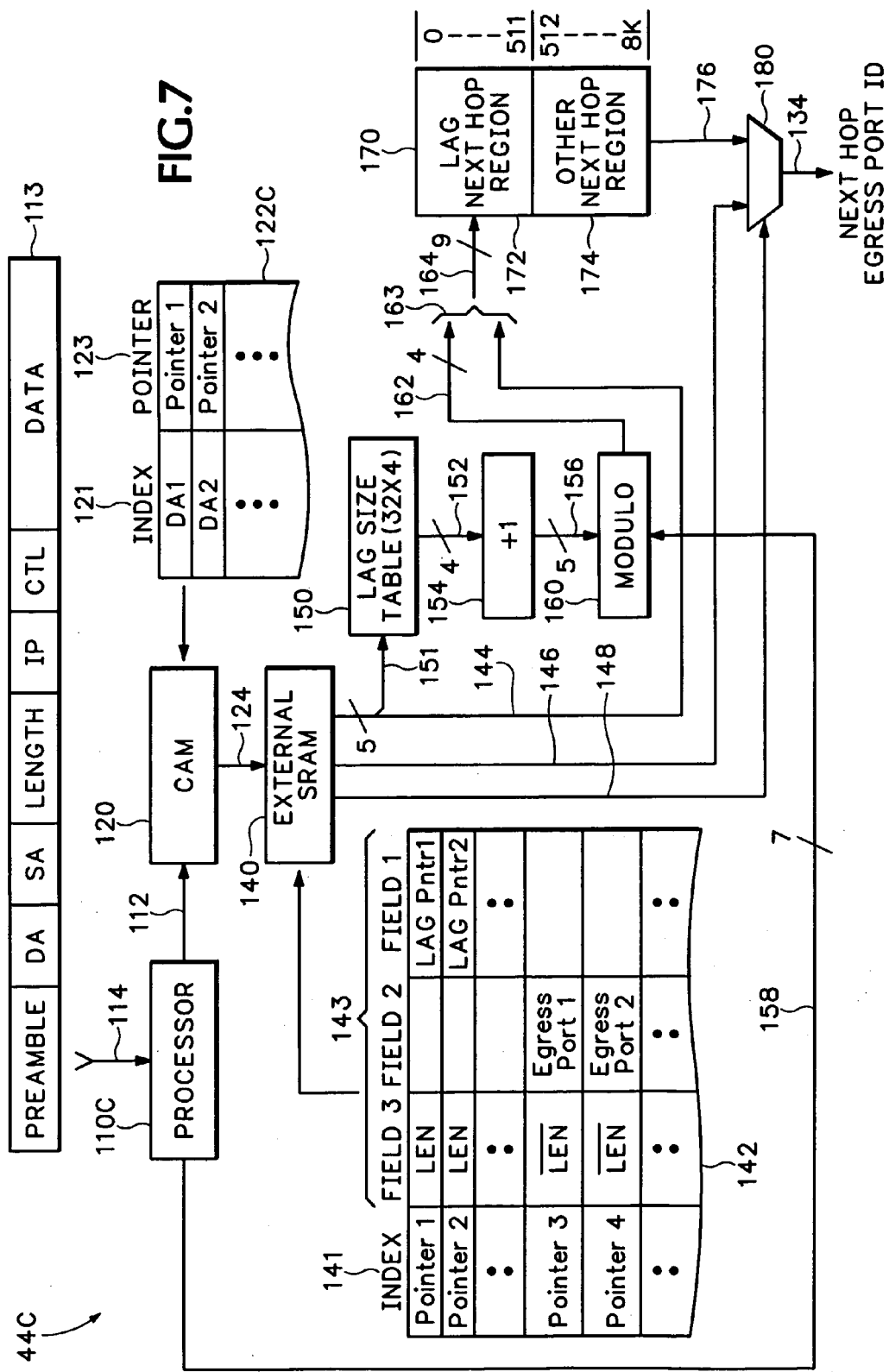
FIG. 7 is a partial, high-level schematic diagram of a network-processing device in accordance with further exemplary embodiments of the present invention, in which packet-forwarding circuits select egress port identifications that are associated with the aggregated links of an identified link-aggregation.

FIG. 7 is a high level block diagram schematically illustrating a LAG circuit available for distributing flows across multiple links of a given link aggregation. Packet processor 44C receives data of data packet 113 at its input 114. Processor 110 C determines the destination address from the data packet and establishes an index or pointer 112 for indexing CAM 120 dependent upon the determined destination address. Additionally, other information from the packet establishes a hash value $HASH_1$ for presentation on hash-input 158 of modulo processor 160. The pointer 112 derived from the destination address is used to index a lookup table 122C of CAM 120. Upon the pointer 112 matching an index 121 of lookup table 122C of CAM 120, another selected pointer value 123 is presented at output 124 of CAM 120 to index a second table 140, for example, an external SRAM device.

Second table 140 comprises a lookup table 142 having plurality of entries 143 indexed by index values 141. Entries 143 comprise different regions for separate output fields 144, 146 and 148. A first output field 144 can provide a LAG pointer when table 140 is appropriately indexed. A second output field 146 provides egress port identifications directly, while a third output field 148 establishes a LAG-enable signal to control a multiplexer 180.

Firstly, assuming that CAM 120 provides a pointer to second table 140 with a value matching, for example, pointer-3 as represented in the illustrated look-up table 142, then the third output field 148 presents a non-active LAG-enable signal ($\overline{LEN}$) to configure multiplexer 180 to select the second output field 146 of table 140 for designating the next-hop, egress port identification.

Continuing with reference to FIG. 7, an alternative destination address can cause CAM 120 to generate a pointer value, e.g., pointer-1, for indexing the second table 140. Such a pointer-1 index match in the second table will cause an entry 143 to be retrieved for presenting an active LAG-enable signal (LEN) at third output field 148 of the second table 140. At the same time, the first output field 144 presents a LAG pointer $LAG_{PNTR1}$, as associated with the particular pointer-1 indexed entry, to provide an index input 151 of LAG-size table 150.

In accordance with a particular exemplary embodiment of the present invention, LAG-size table 150 determines a LAG-size representative of the number of links associated with an identified link aggregation LAG. If the LAG-size table comprises 32 entries of the different LAG IDs and each entry has a possibility of sixteen different LAG-size values, then there exists a total of 512 possible physical links that could be separately identifiable. As a part of determining which of the 512 possible links to use, for example, the LAG size value from the output 152 of the LAG-size table 150 is forwarded to a LAG-distribution circuit, which comprises incrementor 154 and modulo processor 160. The distribution circuit selects a random integer of value between zero and sixteen, i.e., a value up to the number of links of the identified link aggregation. The random value that is provided from output 162 of the distribution circuit is combined with the LAG-ID 144 at combination node 164 to generate a next-hop pointer of value between zero and 512. The random value provided by modulo processor 160 establishes the least significant bits of the next-hop pointer 164 while the LAG ID provides the most significant bits. For example, assume the distribution circuit comprises four output bits 162, these output bits are then combined with five bits 144 of the LAG-ID at summary node 163 to provide a total of nine bits 164 of a next-hop pointer for indexing the next-hop table 170. The generated next-hop pointer 164 is used to index the next-hop table 170.

In accordance with a particular exemplary embodiment, incrementor 151 of the distribution circuit receives and increments a LAG-size value from the output 152 of LAG-size table 150 to provide a LAG length 156 for presentation to mod-processor 160. At its hash input 158, mod-processor 160 receives the hash value $HASH_1$ from processor 110C and performs one of a mod or modulo operation of the hash value acted upon by the received LAG length 156. As described before, the output of the mod-processor 160 is combined with the LAG ID to establish a next-hop pointer 164 for indexing next-hop table 170.

Upon establishing an index match in the next-hop table 170, a next-hop egress port identification is presented at output 176. To select this next-hop, egress port identification of the next-hop table 170, the third output field 148 of the second table 140 provides a LAG-enable signal (LEN) that configures multiplexer 180 to select the output 176 of next-hop table 170.

Figure 8:
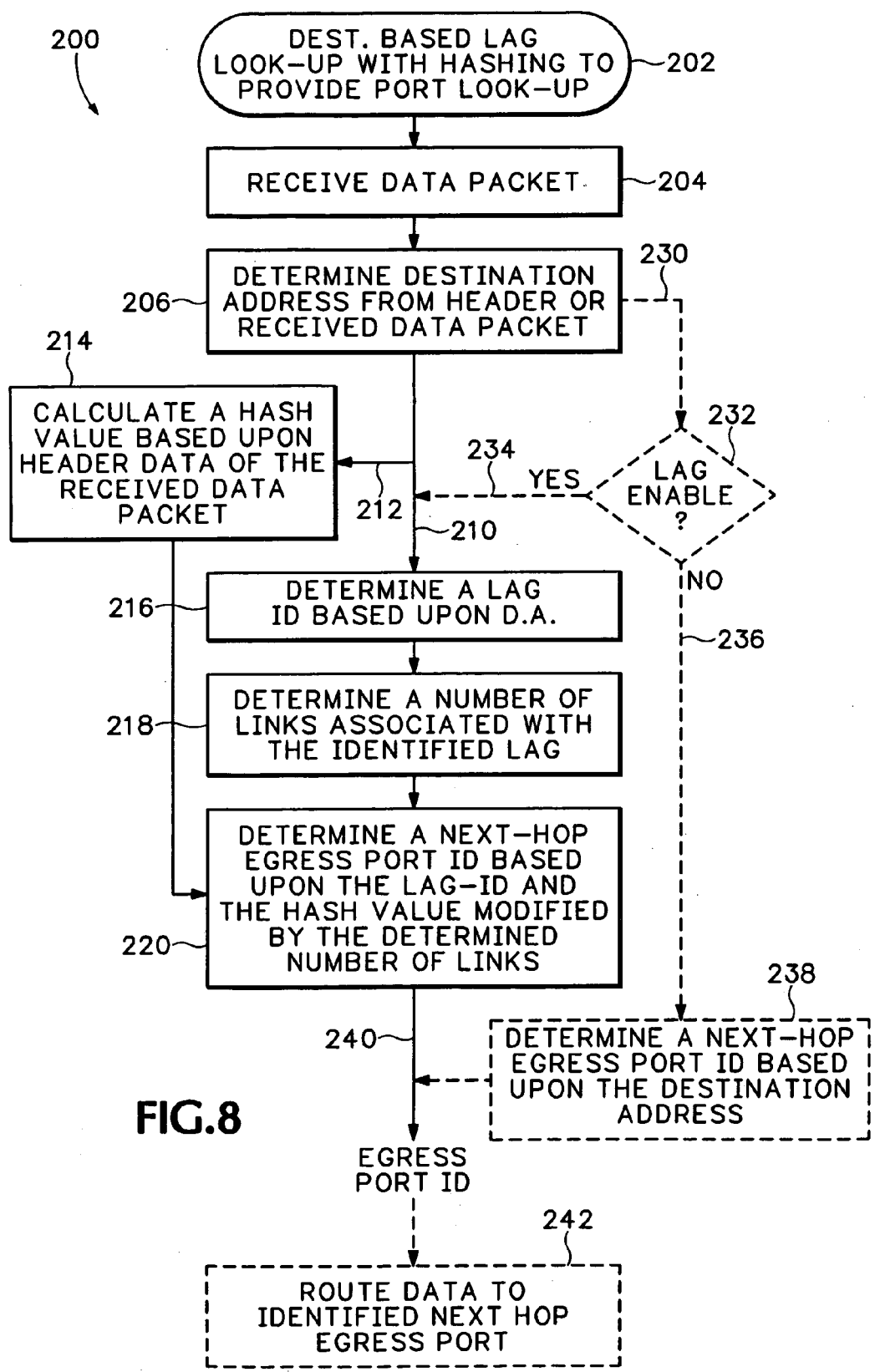
FIG. 8 is a simplified flow chart showing a method of distributing packet flows across a plurality of links associated with a given link-aggregation as associated with further exemplary embodiments of the present invention.

In accordance with an exemplary method 202 of distributing data flows across multiple links of a link aggregation, with reference to flowchart 200 of FIG. 8, a data packet is received 204 and a destination address 206 determined from a header of the received data packet. Optionally, the method continues along path 230 to query whether or not a LAG operation is to be used, wherein the LAG operation query determination is based upon the destination address and the IP protocol of the data propagation. If no LAG operation is to be used, the method follows path 236, for determining 238 an identification of the next-hop egress port directly via the destination address. On the other hand, if query 232 determines that a LAG operation is to be used, then the method traverses alternative path 234, i.e., to paths 210,212.

Continuing with reference to the LAG-enable procedure of FIG. 8, per paths 210, 212 a LAG-ID and a hash value are derived 216, 214 from header information of the received data packet. Next, the number of links associated with the identified LAG is determined 218 and the next-hop egress port selected 220 from amongst the links of the identified LAG, wherein the selection is dependent on the previously derived hash value.

In accordance with one exemplary embodiment of the present invention, the egress-port identification selects one of the available LAG entries using a distribution algorithm comprising a mod or modulo operation that acts upon the hash value using an integer divisor equal to the number of available links.

Upon determining the identified egress-port, the previously received data is routed 242 to the identified egress port. In accordance with further exemplary embodiments of the present invention, as similarly presented earlier herein relative to FIGS. 4 and 6, the received data can be encapsulated, labeled, or have its label switched with a new label per the established layer (e.g., layer-2 or layer-3) internet protocol of the data flow environment.

Figure 9A:
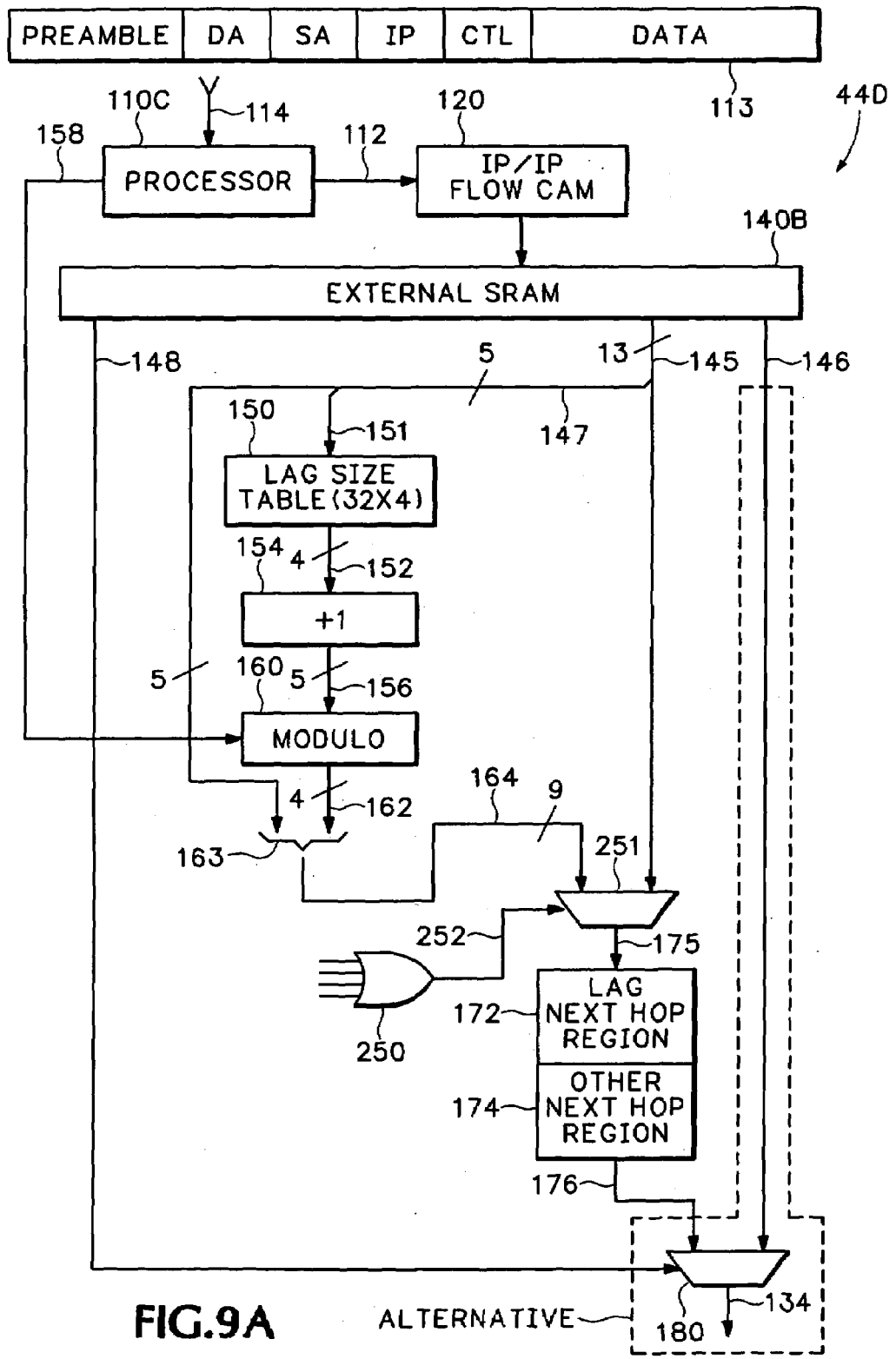
FIG. 9A is a partial, high-level block diagram schematically illustrating a multiple-link network-processing device in accordance with further exemplary embodiments of the present invention, in which packet-forwarding circuitry includes LAG circuits selectable to distribute flows across a plurality of egress ports associated with a given aggregation of links.

In accordance with another exemplary embodiment of the present invention, moving forward with reference to FIG. 9A, packet processor 44D, comprises both a LAG circuit (as disclosed previously herein relative to FIG. 7) and an alternatively selectable, multi-path distribution circuit of a different layer protocol, e.g. layer-3. Processor 10C receives and determines the destination address of data packets 113 at input 114, and derives an index value 112 based upon the destination address for indexing CAM table 120. CAM 120, similarly as described before relative to FIG. 7, forwards a selectively indexed pointer to second table 140B, for example, of an external SRAM device. Additionally, processor 110C calculates a hash value $HASH_1$ based upon additional information of the header of the received data 113. The hash value is coupled to hash-input 158 of a distribution circuit 154,160.

The second table 140B, comprises a plurality of output fields 146, 145 and 148. The first field 146 is part of an optional configuration that directly outputs optional, alternative egress port identifications to multiplexer 180. When indexed appropriately by pointers of CAM 120, the second table can provide next-hop port identifications directly to the multiplexer, wherein the third output field 148 of the second table 140B presents a control signal (for example, look-up-enable LEN) to the control input 148 of multiplexer 180 for selecting the first output field 146 of the second table for designating the next-hop, egress port ID.

Figures 9B, 12:
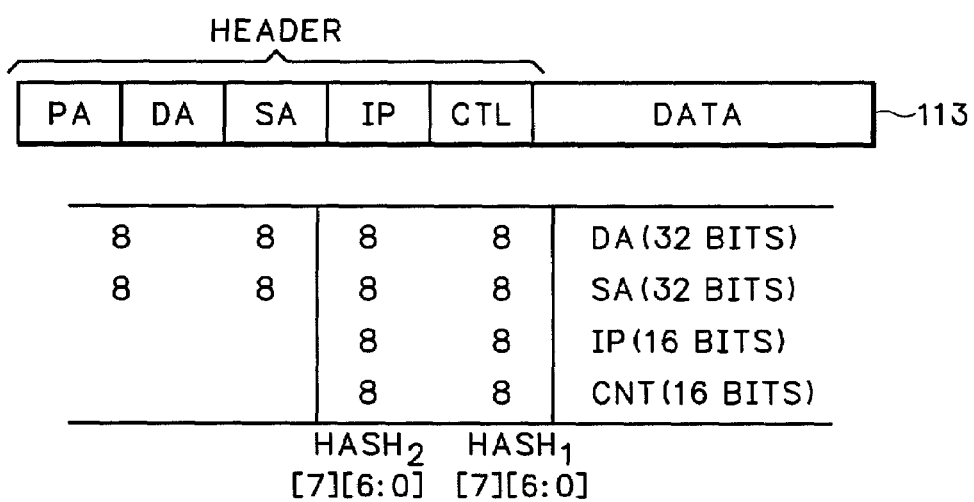
FIG. 9B shows an exemplary mapping of the data contents of a table of FIG. 9A, in which the table comprises a plurality of separate fields.
FIG. 12 is a diagram characterizing a random value distribution procedure for providing hash values in accordance with exemplary embodiments of the present invention.

Referencing FIG. 9B, the entries of look-up table 142B of second table 140B include index values, e.g., PNTR1, PNTR2 . . . for entries 153 with in-active values (EN) for the control signal 141 of the third output field to disable the look-up table functionality, and port identifications egress-port-1, egress-port-2 . . . for the first field 143 as shown for the particular exemplary embodiment. Other pluralities of entries 155 in table 142B, for example, as indexed by index values PNTR3, PNTR4 . . . include LAG identifications, for example, LAG-ID1, LAG-ID2 . . . for the second output field 133 and enable signals (EN) for the third output field 141.

When an entry of the second plurality of entries 155 of lookup table 142B is indexed, the second field 139 provides a LAG identification value less than 512, wherein the most significant bits of the second field are zero while the least significant bits, e.g., bits[0:8], of the second field provide a LAG identification. A portion (e.g., least significant bits) of the second output field 145 (FIG. 9A) of second table 140B is directed to establish a LAG-ID pointer 151 to index the LAG-size table 150. The first portion is additionally forwarded by line 164 to grouping node 163. LAG-ID pointer 151, taken from the first subportion, indexes LAG-size table 150 to obtain a number of links associated with the given identified LAG. The determined LAG-size is output to the distribution circuit 154, 160. The distribution circuit, similarly as presented before relative to FIG. 7, utilizes the LAG-size in combination with the hash value to determine, using a random distribution procedure, which one of the available number of links of the identified LAG to use in a next-hop data transfer.

In accordance with a more particular, exemplary embodiment of the present invention, distribution circuit comprises incrementor 154 and a mod or modulo processor 160. Incrementor 154 increments the LAG-size value at the output 152 of the LAG-sized table 152 to provide a LAG-length input 156 to mod processor 160. The mod processor receives a hash value from data processor 110C at hash input 158 and performs one of a mod or modulo operation of the hash value using the LAG-length from incrementor 154 to obtain a resultant output residual 162. The residual output 162 is received by grouping node 163 to establish the least significant bits of the next-hop pointer at output 164 of grouping node 163. The most significant bits of the next-hop pointer comprise the first subportion (for example, the LSB's or other sub-section) of the second output field 145 from the second table 140B. The next-hop pointer of output 164 of grouping node 163 is presented to first selectable input of multiplexer 251.

Continuing with reference to FIGS. 9A and 9B, the second subportion (for example, the most significant bits) of the second output field 145 of second table 140B, serve to establish a control signal 252 for operating multiplexer 251. In accordance with a particular exemplary embodiment, when the second output field 145 of the second table 140 provides an output value less than 512, then logic 250 establishes a control signal 252 to configure multiplexer 251 to select next-hop pointer 175 for indexing next-hop table 172, 174 from the output 164 of the LAG circuit. Alternatively, when the second output field 145 from second table 140B provides a value greater than or equal to 512, then logic 250 establishes a control signal 252 to configure multiplexer 251 to select the next-hop pointer for indexing table 176B directly from the second output field 145.

In other words, for example, OR-gate 250 can receive the most significant bits of the second output field 145 to be used for generating the control signal 252 for driving multiplexer 251. When control signal 252 is low, input 164 is selected for obtaining the next-hop pointer from the LAG circuits. Alternatively, when the control signal 252 is high, multiplexer 251 selects its other input for obtaining the next-hop pointer directly from the second output field of second table 140B.

Further referencing FIGS. 9A and 9B, when CAM 120 indexes entries 157 of the look-up table 142B of the second table 140B, for example, with index values of PNTR5, PNTR6, . . . then next-hop pointer values of the second field 139 of magnitude greater than 512 are presented to the second output field 145 of second table 140B. Additionally, the third field 141 will present an active enable level signal (EN) to the third output field 148. The active level enable signal drives multiplexer 180 to select a next-hop egress-port ID from the output 176 of the next-hop table 176.

Next-hop table 172, 174 has a first plurality 172 of entries that comprise next-hop port ID for identifying ports to links of various link aggregations. A second portion 174 of the next-hop table 172, 174 includes port identifications to be indexed directly, via pointers of value greater than 512, by the second output field 145 of an external SRAM, or second table 140B.

Contrasting a previously described exemplary embodiment, returning briefly with reference to FIGS. 1 and 5, packet processor 44B distributes various flows across a plurality of equal-cost paths, which are separately selectable on the basis of both destination addresses and additional hash information. CAM 120B, as previously programmed, comprises a plurality of different next-hop pointers separately selectable via destination address (DA) and the different hash values. It is noted, however, that because CAM circuitry is expensive, alternative embodiments of the present invention, referencing FIGS. 7, 9A 10A and 11, employ smaller size CAM circuits in combination with, for example, an external SRAM of a second table 140 to accommodate the additional selectable next-hop pointers for a given destination address. Accordingly, the CAMs of the alternative embodiments require only one pointer per destination address, and the additional plurality of selectable pointers are made to be further selectable by distribution circuitry responsive to the additional hash information.

Figure 10A:
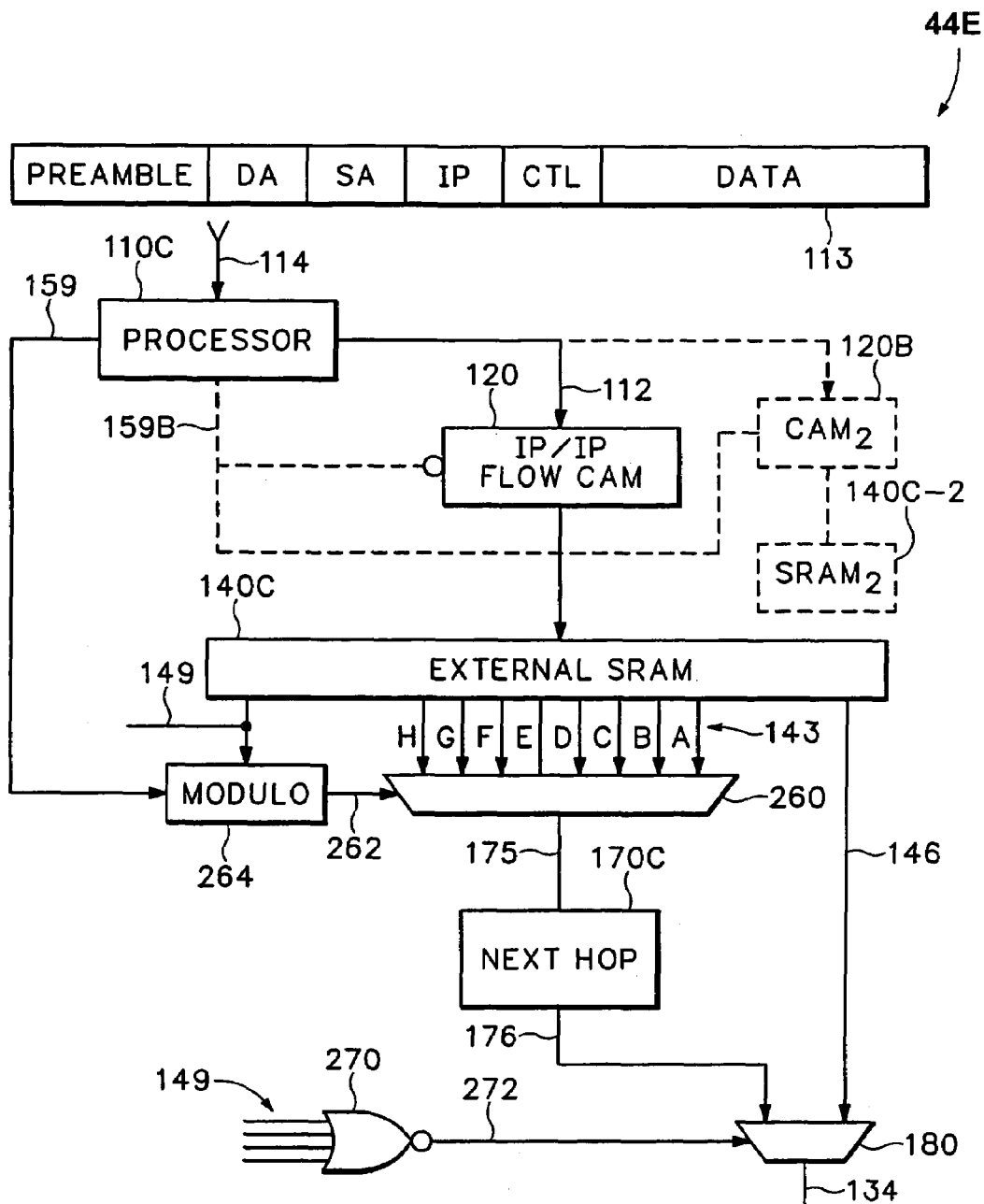
FIG. 10A shows a partial, simplified, high-level block diagram of a network-processing device in accordance with further exemplary embodiments of the present invention, in which a SRAM is indexed by a content addressable memory to provide a plurality of available pointers for paths of equal cost, and wherein a distribution circuit selects one of the available pointers based upon hash information derived from a header of the received data.

Referencing FIG. 10A, packet processor 44E, in accordance with an alternative embodiment of the present invention, includes processor 110C which receives data at input 114. Processor 110C establishes, dependent upon a destination address of the received data, a pointer at an output 112 for indexing CAM 120. Additionally, processor 110C employees a hashing algorithm to generate a hash value $HASH_2$ that is presented to hash input 159 of a second distribution circuit 264. CAM 120 receives the destination based indexing from output 112 of processor 110C and, upon finding an index match, outputs a pointer to second table 140C.

Further referencing FIGS. 10A and 10B, second table 140C comprises a memory map or look-up table 142C having a plurality of fields: field-1, field-2, field-3, and index column 139. In a first plurality of entries 153' within the look-up table 142C (for example, of index values PNTR1, PNTR2, PNTR3 . . . of the index column 139), field-1 143 comprises a plurality of port identifications (e.g., egress-port-1, egress-port-2, egress-port-3) available for output to the first output field 146 of second table 140C when indexed appropriately by an index of CAM 120. Additionally, field-3 141 of lookup table 142C includes a (equal-cost-multi-path) count value equal to zero (CNT=0) to indicate the absence of an equal-cost, multi-path distribution. NOR-logic circuit 270 receives the ECMP count of the third output field 149 of second table 140C to establish enable signal 272 for controlling multiplexer 180. When the control signal input 272 is high, e.g., multiplexer 180 selects and egress-port identification as provided by the first output field of the second table 140C. Alternatively, when the control input 272 is low, multiplexer 180 selects an egress-port identification from the output 176 of next-hop table 170C.

For another plurality of entries 157' (e.g., indexed by PNTR5–PNTR1 . . . ) of lookup table 142C of the second table, field-2 139' provides next-hop pointer values NHP1, NHP2 . . . NHPY that are output when selected within various portions (e.g., eight subportions A, B, C . . . H) of the second output field 143 of the second table 140C. For these entries 157' of the lookup table, the third field 141 is provided a count value greater than zero, for example, values between one and eight.

Continuing with reference to FIGS. 10A and 10B, when CAM 120 indexes an entry of the look-up table 142C having a count value in the third field 141 equal to one, for example, entries indexed by PNTR5–PNTR6 . . . , then the first subportion SUB1 of the second field provides a next-hop pointer (e.g., NHP1, NHP2 . . . ) for presentation at output A of the second output field 143 of second table 140C. Additionally, modulo processor 264 will receive the count value of one from the third output field 141 of table 140C and establish a control signal, e.g., of a zero level, at control input 262 to configure multiplexer 260 for selecting its first input A. Accordingly, the next-hop pointer of the first subportion A of the second output field 143 is used to index next-hop table 170C.

Alternatively, when CAM 120 presents a pointer (for example, PNTR7, PNTR8, PNTR9 . . . ) for selecting an entry having a count value 141 of two, then next-hop pointers of subportion-1 and subportion-2 of the second field 139' of a select entry of table 142C are presented on outputs A and B of the second output field 143. The distribution circuit 264 receives the ECMP count value of two for establishing an upper limit for the control signal of the distribution circuit. Accordingly, the distribution circuit can output a value of zero or one.

In accordance with a particular exemplary embodiment of the present invention, further referencing FIG. 10A, distribution circuit 264 establishes the control signal 262 with a value distributed amongst the available count values less than the ECMP count. For example, distribution circuit 264 will perform one of a mod or modulo operation of the hash value HASH$_2$ acted upon by the ECMP count, as a mod divisor, to establish an output residual 262 as the control signal for driving multiplexer 260. Multiplexer 260 then selects, in accordance with the value (e.g., 0, 1, 2 . . . 7) of the control signal, one of its inputs (i.e., A, B, C . . . H) from which to obtain a next-hop pointer.

Again, the hash value HASH$_2$ at line 159 is based upon header information of received data. It is noted that the header information of received data will remain the same for a given flow, or for a given data transport application. Accordingly, the pointer selections (CAM 120, second table 140C and multiplexer 260) will, likewise, remain the same throughout the same data transfer application or flow.

When an ECMP count value 141 (FIG. 10B) greater than zero is presented at the third output field 149 (FIG. 10A), NOR-gate logic 270 provides a control signal 272 to configure multiplexer 180 to select output 176 of next-hop table 170C from which to obtain the next-hop egress-port identification. Returning with reference to FIG. 2, route-processing module 60 can then receive the egress-port ID from packet processor 44D and configure switching-fabric 50 appropriately for routing of the received data 113 to the identified egress-port.

For particular exemplary embodiments, for example, of FIGS. 10A and 10B, the second output field of the second table 140C comprises eight possible subportions A–H. In accordance with alternative embodiments of the present invention, alternative pluralities of subportions, for example, nine, ten . . . provide alternative selectable fields for implementing equal-cost, multi-path distribution across a larger (or smaller) group of available paths.

Further referencing FIG. 10A, to provide an increased capacity, in accordance with an alternative exemplary embodiment, processor 110C establishes one bit 159B (HASH [7]) from its hash value to selectively enable one of two different CAM tables 120,120B for generating a pointer. For example, when the additional hash-bit HASH [7] is high, CAM table 120B is enabled for generating pointers to index second SRAM 140C-2. Alternatively, when the hash-bit HASH[7] is low, original CAM table 120 is enabled for generating pointer values to use for indexing first SRAM 140C.

When CAM table 120B is selected, a pointer from CAM 120B indexes the alternative SRAM 140C-2, which will provide a plurality of data output fields 146,143,149 in place of the original SRAM 140C. Under this condition, the original SRAM may have its outputs tri-stated, while the alternative SRAM 140C-2 uses its respective first, second and third output fields to drive (not shown): (i) the first input of multiplexer 180, (ii) ports A . . . H. of multiplexer 260, and (iii) the count-value input of distribution circuit 264 and the inputs of NOR-gate 270. In accordance with such alternative exemplary embodiment, more than eight equal-cost, multi-path pointer selections are selectively available for indexing next-hop table 170C.

In accordance with a further exemplary embodiment of the present invention, a LAG-distribution circuit, as disclosed previously herein relative to FIG. 7, is combined with the equal-cost multi-path distribution circuit of FIG. 10A to provide a more generic packet-processor that is capable of distributing flows across either (i) ports of an identified plurality of equal-cost multiple paths and/or (ii) links of a given link aggregation.

Figure 11:
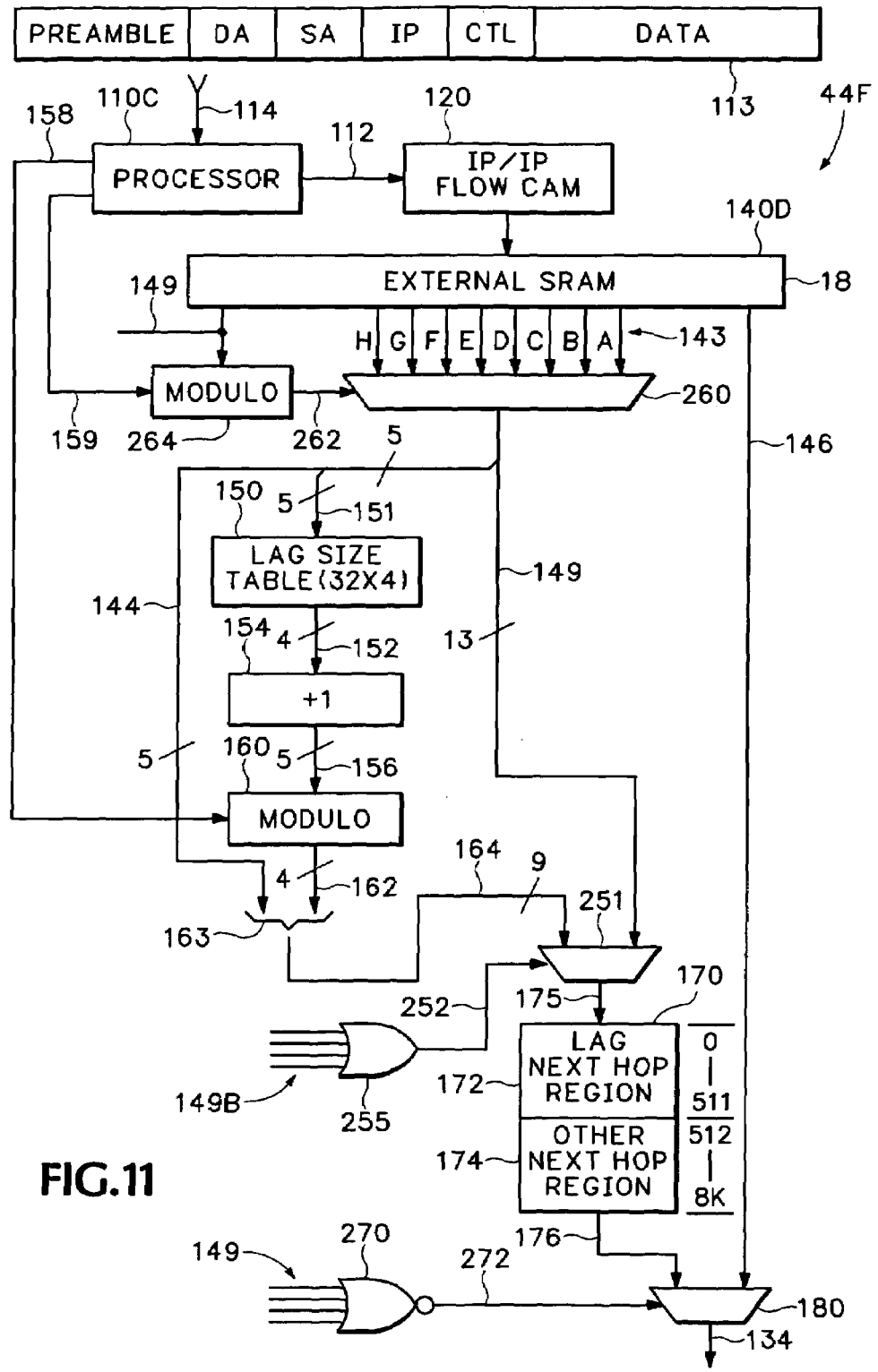
FIG. 11 shows a high-level block diagram schematically illustrating a data packet-processing device of a network processor in accordance with further exemplary embodiments of the present invention, in which LAG distribution circuits are combined with equal-cost, multi-path distribution circuits within a common, or more generic, network packet processor.

Referencing FIG. 11, such a data-packet processor 44F comprises processor 110C that receives data at input 114. Processor 110C obtains a destination address from the header of the receive data for use in indexing CAM 120. Additionally, processor 110C uses different hashing algorithms to act upon the header information of the received data 113 for generating separate first and second hash values (i.e., HASH$_1$ and HASH$_2$). These separate hash values are then used by different distribution circuits. The first hash value $HASH_1$ from processor 10C will drive hash-input 158 of LAG-distribution circuitry 160; while the second hash value $HASH_2$ from processor 110C drives hash-input 159 of the ECMP (equal-cost, multi-path) distribution circuit 264.

The second table 140D comprises a hybrid-combination of lookup table 142C of FIG. 10B and lookup table 142B of FIG. 9B. More particularly, the next-hop pointer values of the second field 139 of entries 155, 157 of table 142B are merged into the second field 139' of the entries of table 142C that have count values 141 greater than zero. Additionally, when these entries provide pointer values less than 512, the LAG circuitry interprets the select subportion of the second output field 143 to provide a LAG ID for indexing LAG-size table 150. But when the subportion of the second output field provides a pointer of a value greater than 512, then the circuitry will determine that the pointer is to be used directly, via multiplexer 251, for indexing next-hop table 170.

When using the LAG circuitry (e.g., 144, 150, 154, 160, 162, 163, 164), the ECMP count 149 provides a value greater than zero and the selected subportion (A, B . . . H) of the second output field 143 provides a pointer value less then, for example, 512. Accordingly, with the most significant bits 149B of the selected subportion 149 providing zero values, OR-gate logic 255 drives multiplexer 251 to select the next-hop pointer from output 164 of the LAG circuitry. Additionally, NOR-gate 270 receives an ECMP count value greater than zero and drives multiplexer 180 to select output 176 of next-hop table 170 for obtaining the selected egress-port identification.

In accordance with an alternative method of operation, the subportions of the second field 139 provide a selectable pointer-value greater than 512, and the third output field an ECMP count greater then zero. Accordingly, multiplexer 251 is driven to select the next-hop pointer directly from a select one of the subportions A . . . H of the second output field 143 of second table 140D, which select next-hop pointer is then used to directly index next-hop table 170. And again, with an ECMP count greater than zero, NOR-gate 270 drives multiplexer 180 select to the output 176 of the next-hop table 170 for obtaining the egress-port identification.

In accordance with yet a further alternative method of operation, the third output field 149 provides an ECMP count equal to zero. NOR-gate 270 receives the ECMP count value of zero and drives multiplexer 180 to select the first output field 146 from SRAM 140D for establishing the select egress-port identification.

Returning with reference to FIG. 1 and FIG. 11, a first level of distribution selection by data-packet processor 44F at layer-3 can establish one of a plurality of equal-cost paths of a layer-3, IP protocol procedure to designate one of egress ports 30,28,26 for transfer of data to respective equal-cost paths 34–40, 42–38, 32–36 toward destination 24. Additionally, a further level of distribution selection by data-packet processor 44F at layer-2 can establish one link of a link aggregation 42 by which to channel the data between routers 28A and 20C, as a part of selected path 42–38. Yet, importantly, each of the layer distribution selections are capable of being implemented via certain ones of the exemplary packet-processor embodiments of the present invention as disclosed herein, e.g., with reference to FIG. 11.

An exemplary algorithm for generating the different hash values—e.g., $HASH_1$ and $HASH_2$—is briefly described below with reference to FIG. 12. In particular, a processor examines a packet header of received data 113 to obtain, e.g., 32 bits of a destination address, 32 bits of a source address, 16 bits of an IP-protocol identification and 16 bits of a control word. The separate bit-regions of the header are then summed, e.g., in a known check-sum fashion, to establish hash values $HASH_1$ and $HASH_2$. More specifically, for example, first and second eight-bit groupings of each of the header components are summed together to generate respective first and second eight-bit, check-sum values: the first eight-bit group of the check-sum establishes the first hash value $HASH_1$ and the second eight-bit group of the check-sum establishes the second hash value $HASH_2$.

Although, having disclosed such an exemplary algorithm for establishing the first and second hash values; it will be understood that other exemplary embodiments of the present invention can incorporate alternative algorithms for generating such hash values. For example, such alternative algorithms could use other data sources, bit groupings, summations, etc., to establish a random distribution of the selection control signals. Likewise, an additional hash value might be generated from another bit-field region of the "check-sums, ", or by simply performing a bit rotation of the exemplary first or second hash values. Such additional hash value computation is utilized in a further embodiment of the present invention, as described below with reference to FIGS. 13–17.

Figure 13:
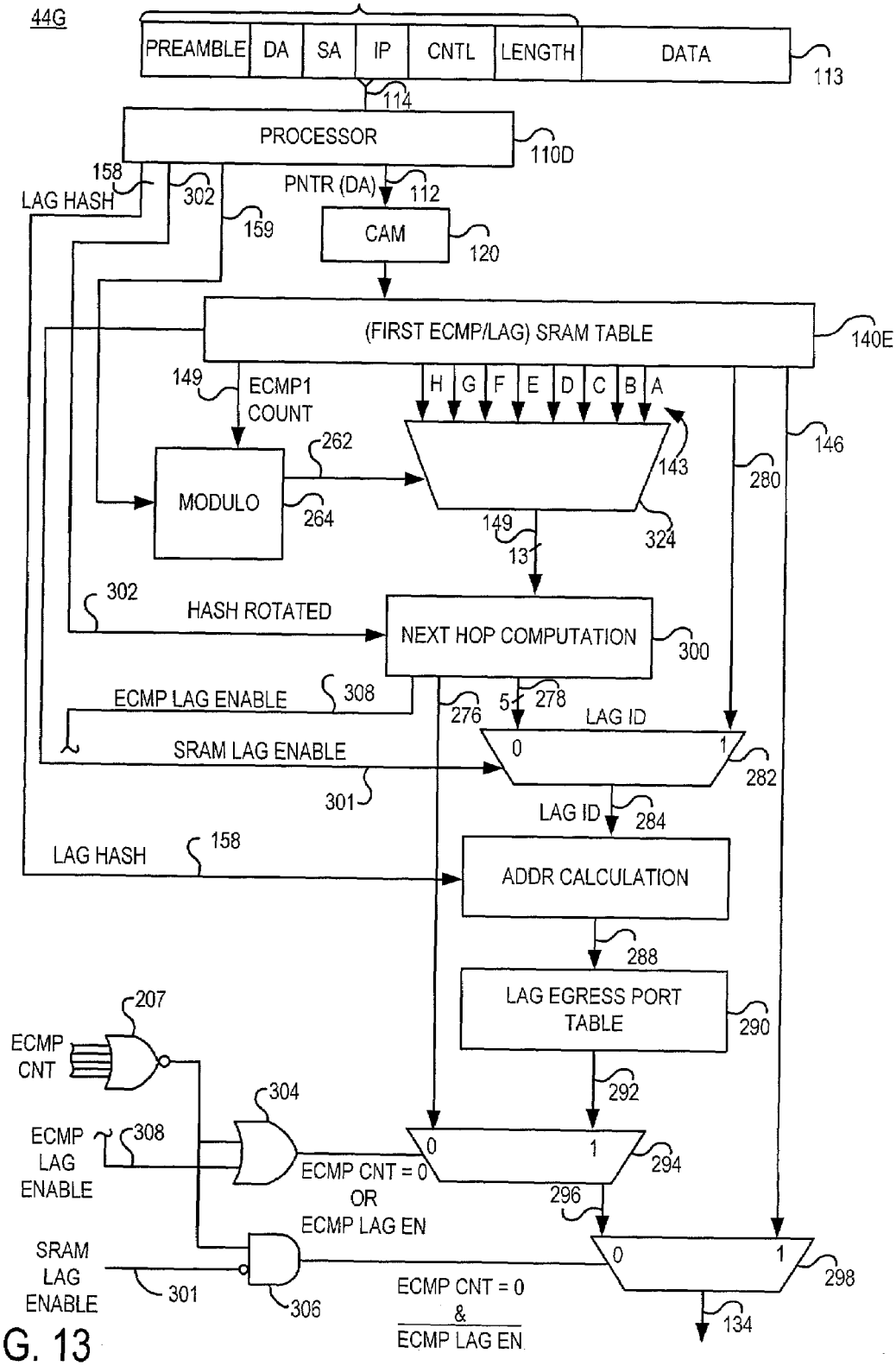
FIG. 13 shows a high-level block diagram schematically illustrating a data packet-processing device of a network processor in accordance with other exemplary embodiments of the present invention, in which multiple equal-cost multi-path distribution tables provide an ability for additional selectable paths.

Referencing FIG. 13, data-packet processor 44G comprises processor 110D that receives data at input 114. Processor obtains a header of the received data and establishes a pointer 112 based upon a part of the header information—e.g., destination address. The processor indexes a CAM 120 using the established pointer. The processor also uses the header information to establish different hash values on lines 158,159,302 to be used by different distribution circuits. For example, a first hash value on line 158 provides a LAG HASH value to an address calculation circuit 286 for LAG circuitry of the packet processor. Other hash values on lines 159 and 302 provide first and second ECMP hash values to respective first and second ECMP distribution circuits of this exemplary data-packet processor.

It will be noted that the present exemplary embodiment of FIG. 13 can be viewed as a "layering" of two ECMP selections that allow for an increased number of selectable paths. Compare this to the exemplary embodiment described earlier herein with reference FIG. 10A, which uses a second CAM 120B to provide for additional plurality of selectable equal cost paths.

Returning with reference FIG. 13, CAM 120 indexes second table 140E at pointer input 112. Typically, the second table comprises an SRAM which is part of a module separate from that of the other circuits (e.g., 276–300) of the data-packet processor 44G. Second table 140E outputs data of a select entry dependent upon the pointer indexing. For example, a first plurality of entries 340 (FIG. 16) of the second table memory map 142E are capable of being indexed by pointers PNTR1–PNTR3 to select entries that have a second bit-field FIELD2 348 programmed to provide an SRAM LAG enable signal of value equal to zero and a third bit field FIELD3 350 of a first ECMP count value equal to zero. Additionally, entries 340 comprise egress port values EGRESS PORT1,2,3 . . . for the first bit field FIELD1 346. When selected, the egress port value of the first bit-field of the select entry is presented to line 146 (FIG. 13) to selectable input of multiplexer 298. In this mode, the packet processor 44G can be operative to establish the selected next hop EGRESS PORT directly from the first table—i.e., by-passing the alternatively operable ECMP and LAG circuits. The low level ECMP count and the SRAM LAG enable signals drive logic NAND gate 306 to establish a control signal to configure multiplexer 298 to select (via line 146) the next hop egress port identification directly from the second table 140E.

In another operating mode, second table 140E receives a pointer that selects from a different plurality 342 of entries, which provide a high level SRAM LAG enable signal for FIELD2 348 (FIG. 16). Additionally, a LAG ID value of the first bit field FIELD1 346 is presented to line 280 (FIG. 13) for propagation to a selectable input of LAG ID multiplexer 282. The SRAM LAG enable signal configures (via control input 301) the multiplexer 282 to select a LAG ID from the LAG ID output 280 of the second table 140E and allows an egress port for the next hop to be determined by LAG circuitry, by-passing available ECMP circuitry, wherein multiplexers 294,298 receive control signals of logic 304, 306 to be configured to select an egress port identification from the LAG distribution circuitry.

Finally, when indexing the second table 140E with a pointer to select an entry of a third plurality 344 of entries, further referencing FIGS. 13 and 16, an ECMP count value greater than zero from the third bit field FIELD3 350 is presented to output 149 of the second table 140E. The other outputs 143A–H of the second table 140E receive sub-portions SUB1–SUB8 of the first bit field FIELD1 346. The ECMP1 count value of output 149 is received by NOR gate 270 and enables multiplexer 298 to select an egress port identification from output 296 of multiplexer 294 as derived from one of the ECMP distribution circuits, the LAG distribution circuits or alternatively both, wherein the multiplexer 294 selection depends on the ECMP LAG enable control signal presented to OR-gate 304.

As illustrated in FIG. 16, the bits of the third, second and first plurality of entries 344,342,340 can overlap. In this particular exemplary embodiment, control signals 348,350 determine the significance of data of the first field FIELD1 as well as the manner in which the data will be interpreted. When the SRAM enable signal 301 is low, multiplexer 282 (FIG. 13) is configured to select a LAG ID value from the next hop computation unit 300; otherwise, it selects a LAG ID value from output 280 of second table 140E. Additionally, it is understood that although output 280 is shown separate from the others in FIG. 13, output 280 can actually overlap portions of output fields 143,146. The configurations of multiplexers 282,298 establish the significance of these outputs.

Returning to the second operating mode of this exemplary embodiment with reference to FIGS. 13 and 16, the second table 140E is indexed to select an entry of the second plurality 342. The second table 140E presents the LAG ID value to an input of multiplexer 282. The SRAM LAG enable signal from the second table, configures the multiplexer 282 to use the LAG ID value for driving LAG ID input 284 of the LAG circuitry 286,290. By-passing the alternative ECMP distribution circuitry (e.g., 260, 300), packet processor 44G will operate similarly to the exemplary embodiment presented earlier herein relative to FIG. 7.

Figure 15:
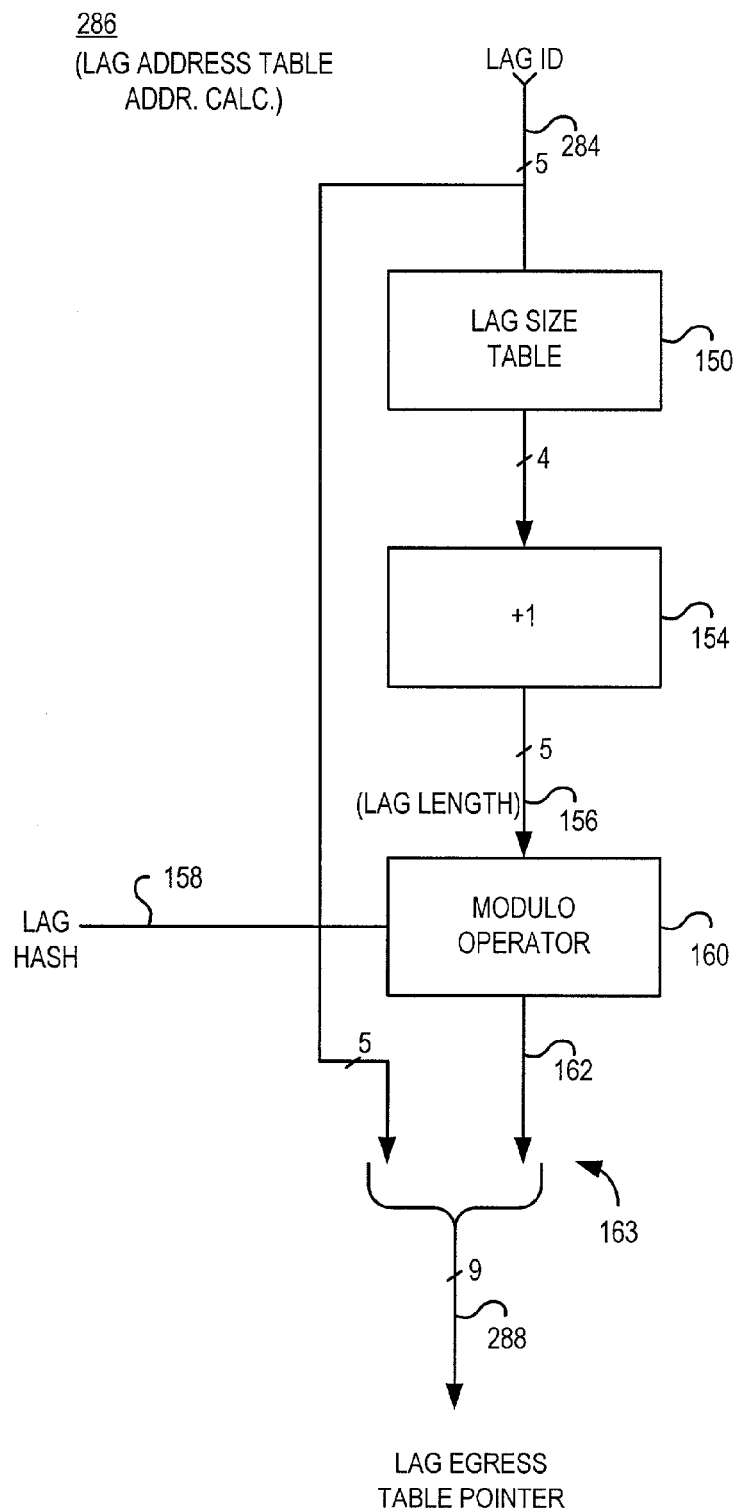
FIG. 15 is a block diagram of a LAG address calculation circuit of FIG. 13 in accordance with exemplary embodiments of the present invention.

Referencing FIGS. 13 and 15, the LAG ID at input 284 of LAG circuit 286 determines a LAG-size from a LAG-size table 150. The LAG size establishes the number of links associated with the identified link aggregation LAG. LAG-distribution circuit, e.g., incrementor 154 and modulo processor 160, receives the LAG-size value and establishes a random integer of value between zero and up to the number of links of the identified link aggregation. Node 163 combines the random value from output 162 of the distribution circuit with the LAG-ID 284 to generate a next-hop pointer of value, e.g., of between zero and 512. The output 162 provides the least significant bits of the next-hop pointer 288 while the LAG ID provides the most significant bits of the next-hop pointer for indexing the next-hop egress port table 290 (FIG. 13).

Once the pointer finds an index match in the next-hop table 290, a next-hop egress port identification is presented at output 292. To select this egress port identification, the multiplexer 294 is configured to select the output of table 290. As noted above, the ECMP count is zero, therefore, NOR and OR gates 270, 304 output high level signals. Further, the SRAM LAG enable signal at the inverted input 301 of NAND gate 306 high, such that the output of NAND gate provides a low level for configuring multiplexer 298 to propagate the selected next-hop egress port value of table 290 to output 134.

In an alternative operating mode, or configuration, further referencing FIG. 13, the LAG ID supplied to input 284 of the LAG circuitry is derived from ECMP circuitry of the data packet processor 44G rather than directly (via line 280) from the second table 140E. This ECMP/LAG configuration and operating mode, in accordance with exemplary embodiments of the present invention, can be used when the router is operating one or more paths of a plurality of equal cost paths (of an ECMP application) that comprise an aggregation of links—i.e., one or more of the ECMP paths is/are LAG'ed. For such condition, second table 140E receives a pointer from CAM 120 that points to an index 356 to select an entry of the plurality 344 of the memory map 142E (FIG. 16). A first ECMP count value from the third bit field FIELD3 350 of the selectively indexed entry is presented on output 149 of second table 140E, which is propagated to distribution processor 264 (e.g., modulo processor) and also to logic 270,304,306.

Additionally, the SRAM LAG enable value for the second bit field FIELD2 348 (FIG. 16) of the indexed entry provides a low level output to be propagated by line 301 for configuring multiplexer 282 to select the LAG ID from output 278 as provided by ECMP circuitry of the packet processor 44G. Briefly referencing FIGS. 14 and 17, an ECMP LAG enable signal is also available from one of a third table 312 or fourth table 328, which are part of computation unit 300. The ECMP LAG enable signal is propagated by line 308 to logic 270,304,306 to configure multiplexer 294 to select a next hop egress port value from the LAG circuitry—i.e., line 292 from port table 290.

Further referencing FIGS. 13 and 16, the indexed entry of the plurality of entries 344 provides next hop pointer value (s) (e.g., NHP1, NHP2 . . . ) from sub-portions (e.g., SUB1–8) of the first bit field FIELD1 346 to respective bit-field outputs 143A,143B . . . 143H of the second table 140E. Similarly as presented earlier herein with reference to FIG. 10A, distribution circuitry 264,262,260 selects one of the possible next hop pointer-values from the outputs 143 of the second table. The selected next hop pointer-value is then propagated along path 149 to the next hop computational unit 300.

In this particular exemplary embodiment, the distribution circuitry 264, 262,260 comprises modulo processor 264, which receives a count value from the third output field 149 of table 140E and establishes a control signal at control line 262 for configuring multiplexer 260 to select one of its multiple inputs A–H. The ECMP count value establishes an upper limit for the control signal. Distribution circuit 264 establishes the control signal 262 with a value distributed amongst the available count values that is less than the ECMP count. In accordance with a particular exemplary embodiment of the present invention, distribution circuit 264 performs one of a mod or modulo operation, acting upon the received hash value at input 159 using the ECMP count 149 as a mod divisor. The resultant residual 262 establishes the control signal for multiplexer 260. Multiplexer 260 then selects, in accordance with the control signal, a next hop pointer-value (e.g., 0, 1, 2 . . . 7), from one of the bit fields i.e., A, B, C . . . H of the second output field FIELD2 143 from which to obtain a next-hop pointer for indexing the next hop computational unit 300.

Again, the hash value at line 159 is based upon header information of received data, which remains the same for a given flow, transport application or differentiated service code type. For such cases, the pointer selections provided by CAM 120 to second table 140E, typically, remain the same throughout the same data transfer, flow or service application.

Figure 14:
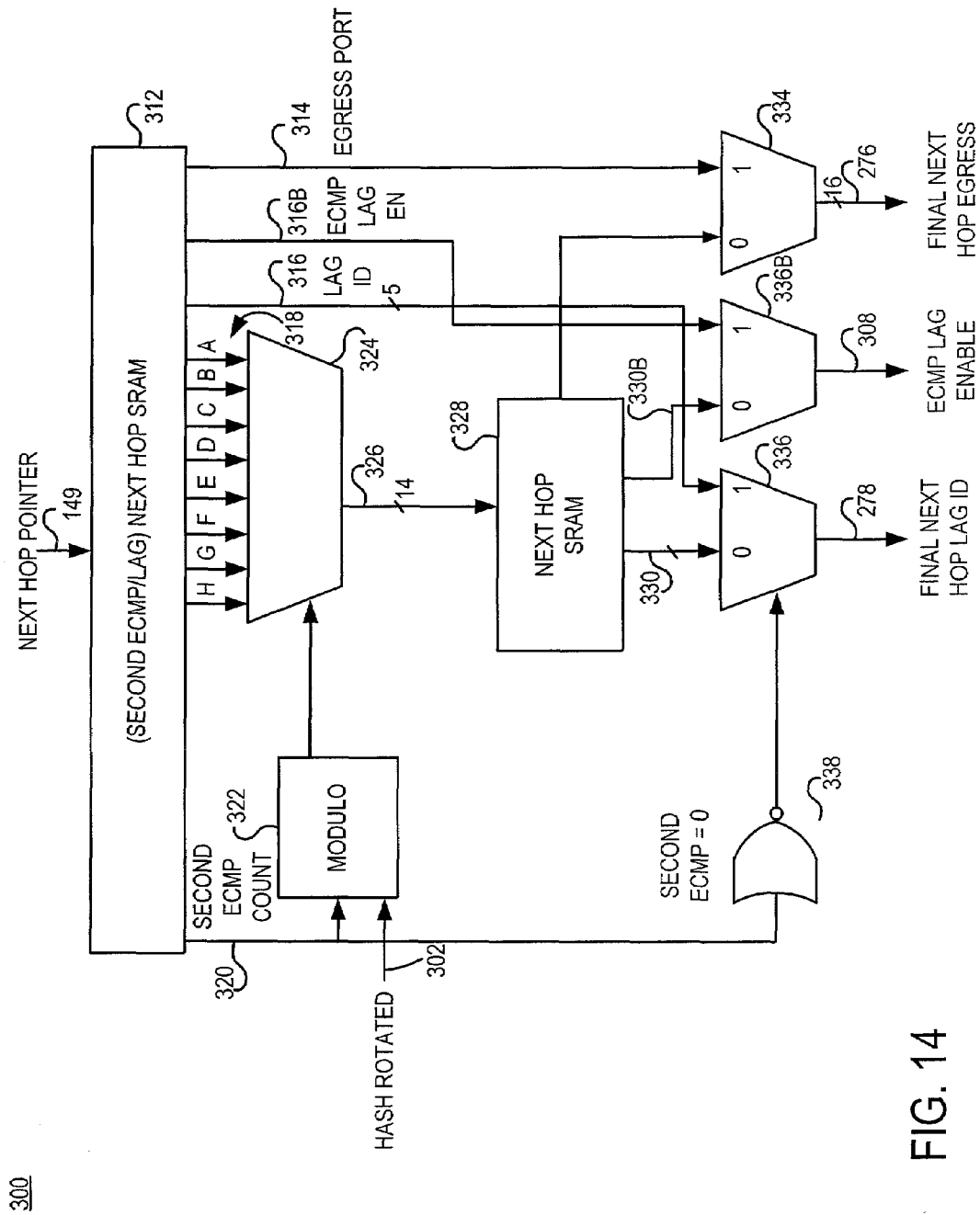
FIG. 14 shows a block diagram of a next-hop/LAG-ID computation circuit of FIG. 13 associated with exemplary embodiments of the present invention.

Moving forward with reference to FIGS. 13 and 14, next hop computational unit 300 receives a pointer at input 149. Third table 312 (FIG. 14) comprises a memory map 313 (FIG. 17) similar to the memory map 142E (FIG. 16) of the second table. Table 312 typically comprises an SRAM device. The memory map 313 of the second table comprises first, second and third bit fields FIELD1 346', FIELD2 348' and FIELD3 350'.

For a first plurality of entries 340', the first field comprises egress port values (e.g., EGRESS PORT 1, EGRESS PORT 2 . . . ) that can be selected for output onto direct line 314 that is coupled to a selectable input of multiplexer 334. When one of these entries is selected, the second ECMP count value (note, this is termed second in comparison with the first ECMP count value of table 140E of FIG. 13) of zero value from the third bit field FIELD3 is presented to output 320 and propagated to distribution processor 322, 324. This distribution processor circuitry 322,324 operates similarly to the distribution circuitry 264, 260 as described previously herein with reference to FIG. 13. The second ECMP count-value is also sent to logic 338 for controlling configuration of multiplexers 336, 336B, 334. When the second ECMP count-value is equal to zero, multiplexers 336, 336B, 334 are configured (via logic 338) to select the lines 316, 316B, 314 having data supplied directly from third table 312. The outputs 278, 308, 276 of the multiplexers forward the final next hop LAG ID, the ECMP LAG enable signal and the final next hop egress identification respectively. In such configuration, a second level of available ECMP processing is by-passed.

Alternatively, an entry of the second plurality of entries 342' (referencing the memory map 313 of FIG. 17) is selected, and the second bit field FIELD2 provides a high level for the ECMP LAG enable signal to output 316B of the third table 312. The first bit field FIELD1 provides a LAG ID value to output 316. With a second ECMP count value of zero, the LAG ID and ECMP LAG enable signals are routed by multiplexers 336,336B to LAG ID output 278 and ECMP LAG enable output 308 respectively. Referencing FIG. 13, these signals are propagated to LAG circuitry 282,286,290, 294 and to logic 304.

Another avenue for invoking the ECMP/LAG operation incorporates the second layer of available ECMP processing—e.g., of circuitry 318,322,324,328. (Note, in the present context, the "second layer" descriptor is not to be confused with layer terminology of IP protocols, such as Layer-2 or Layer-3) The pointer received at input 149 (FIG. 13) indexes an entry of the third plurality of entries 344' (memory map 313 of FIG. 17). The indexed entry of plurality 344' provides its next hop pointer value(s) (e.g., NHP1, NHP2 . . . ) of the sub-portions (e.g., SUB1–8) of the first bit field FIELD1 346' to respective bit-fields 318A,318B, . . . 318H of the output of the third table 312. Similarly as presented before with reference to distribution circuitry 264,260 of FIG. 13, distribution circuitry 322,324 selects one of the possible next hop pointer-values 318 dependent upon the values of the second ECMP count value at line 320 and the hash value received at line 302. In accordance with a particular exemplary embodiment of the present invention, the ECMP hash value supplied to line 302 comprises a bit rotation of the first ECMP hash value for the first ECMP distribution circuit.

Multiplexer 324 couples the next-hop pointer value of the selected subfield to path 326 to provide an index into fourth table 328. The memory map for the fourth table 328 comprises a plurality of entries similar to entries 340',342' of memory map 313 of FIG. 17, but, typically, absent bit field 350' of the ECMP count values. The pointer received by the fourth table seeks an index match amongst indexes 352 (relative to the representative memory map 313) and targets a select entry of amongst the entries 340' or 342'. In one exemplary embodiment, table 328 comprises the same type of SRAM as that of table 312, except that its output pins associated with the third bit field and any other unused bit fields are ignored (e.g., terminated or left open).

An index match amongst entries 340' in the fourth table (of memory map similar to map 313) yields an egress port value (e.g., EGRESS PORT 1, EGRESS PORT 2 . . . ) of the select entry that is to be propagated via line 332 to a selectable input of multiplexer 334. Additionally, an ECMP LAG enable value of the selected entry provides a signal to be propagated by line 330B to a selectable input of multiplexer 336B. Selecting these inputs, multiplexers 336B, 334 forward the egress port value and ECMP LAG enable signal of the select entry of the table 328 to multiplexer outputs 308,276 respectively. Referencing FIG. 13, output 276 provides an egress port value to be presented to a selectable input of multiplexer 294, while output 308 delivers, e.g., the low level ECMP LAG enable signal to logic 304. With the ECMP count not equal to zero and the ECMP LAG enable signal low, the multiplexers 294,298 couple the egress port value of line 276 to output 134 to establish the resultant next hop egress port. In this manner, both layers of ECMP processing are used to establish the egress port identification, and the LAG circuitry is by-passed.

Figure 17:
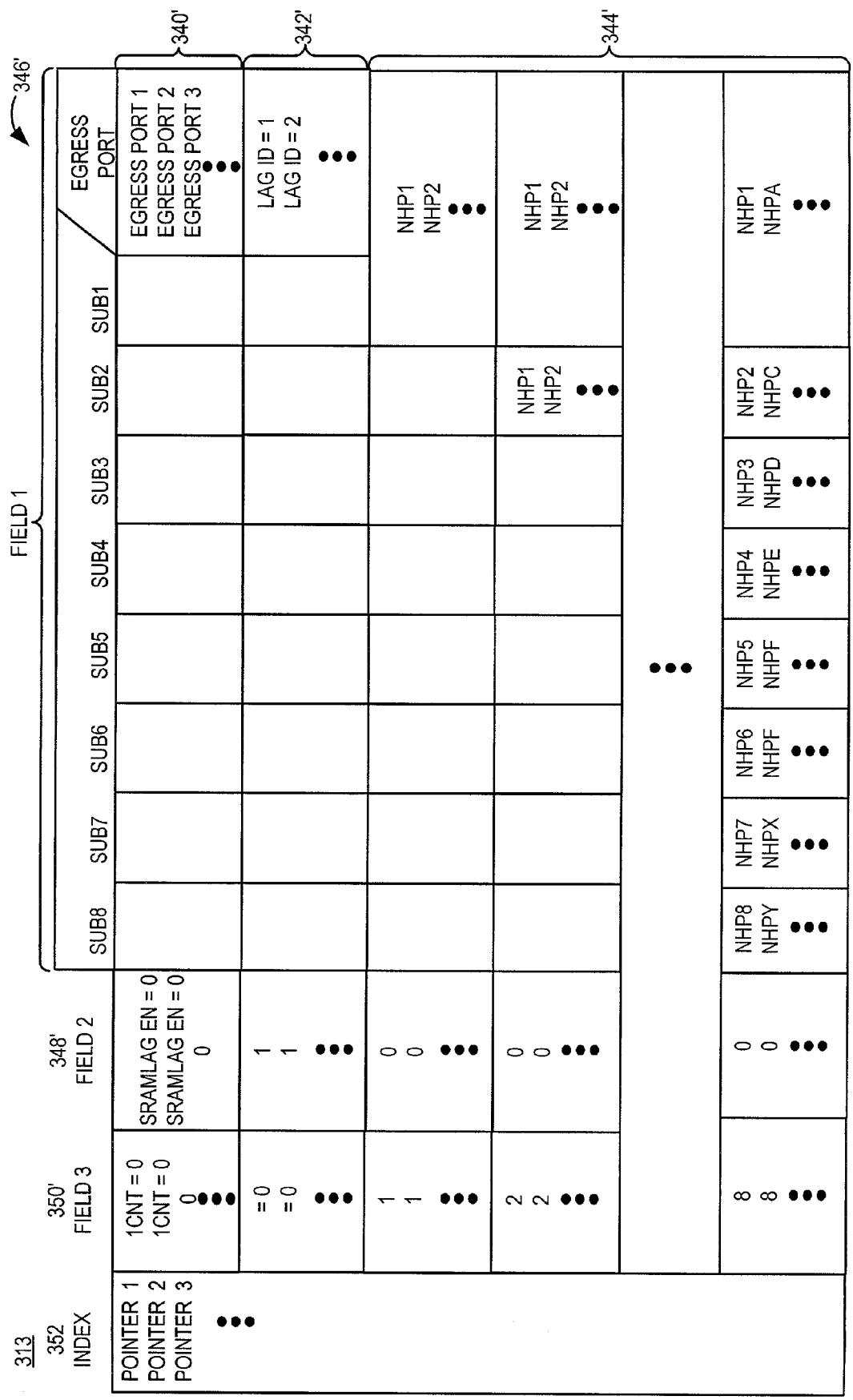
FIG. 17 shows the contents of another lookup table for the schematic diagram of FIGS. 13 and 14.

Returning to the alternative ECMP/LAG operating mode, further referencing FIGS. 13,14 and 17, a different entry of table 328, e.g., such as an entry of plurality 342' (again using the memory map 313 as the exemplary memory map of table 328) provides a LAG ID value (e.g., LAG ID 1, LAG ID 2 . . . ) to be presented via line 330 to a selectable input of multiplexer 336. The ECMP LAG enable data of the selected entry provides, e.g., a high level signal to be sent (via line 330B) to a selectable input of multiplexer 336B. Selecting these inputs, multiplexers 336, 336B forward the LAG ID value and ECMP LAG enable signal to outputs 278,308 respectively. Referencing FIG. 13, output 278 forwards the LAG ID value to a selectable input of multiplexer 282, while output 308 delivers, e.g., the high level ECMP LAG enable signal to logic 304. Multiplexer 282 is configured to route the LAG ID of output 278 to the LAG circuitry, while multiplexers 294,298 couple the determined LAG egress port value of line 292 to output 134. In this sequence, all of the ECMP and LAC circuits are used to obtain the egress port identification.

It will be apparent to those skilled in this art that the embodiments described above are exemplary and that various changes and modifications may be made thereto as become apparent upon reading the present disclosure. Such changes and modifications are considered to fall within the scope of the appended claims.

What is claimed is:

1. A network-processing device comprising:
   a first table to be addressed by content information of received data, and to provide output data dependent upon the content information;
   a second table to be addressed by an output of the first table, and comprising an output to present output data dependent upon the output of the first table, the output comprising a plurality of fields; and
   a multiplexer operable to obtain information of a next-hop transfer of the received data by selecting from amongst a plurality of next-hop designations;
   separate fields of the plurality of the second table to originate at least two of the next-hop designations.

2. A network-processing device according to claim 1, further comprising a processor to obtain content information from a header of the received data;
   the first table comprising a content addressable memory;
   the processor to use the obtained content information to address the content addressable memory; and
   the content addressable memory having separate pointer entries to be selectively output dependent on the content information presented thereto.

3. A network-processing device according to claim 2, in which
   the second table is addressed by the output of the content addressable memory;
   the second table to output data for the separate fields dependent on the output of the content addressable memory;
   a first field of the plurality to originate one of the plurality of next-hop designations; and
   a second field of the plurality to originate at least another of the next-hop designations.

4. A network-processing device according to claim 3, in which the first field of the plurality is coupled directly to the multiplexer to provide one of the next-hop designations.

5. A network-processing device according to claim 4, further comprising:
   a third table;
   the third table comprising a plurality of selectable entries comprising next-hop data;
   the second field of the output of the second table to index the third table;
   the third table to output next-hop data from a select entry thereof, the entry selection dependent upon the indexing established by the second field of the output of the second table; and
   the output of the third table providing another of the plurality of next-hop designations.

6. A network-processing device according to claim 5, in which the second field of the output of the second table comprises at least two subportions;
   the network-processing device further comprises a second multiplexer to select one subportion from the at least two subportions; and
   the second multiplexer is to index the third table with the select one subportion.

7. A network-processing device according to claim 6, the second multiplexer to make the selection dependent upon a control signal;
   the output of the second table further comprising a third field; and
   the third field to establish the control signal.

8. A network-processing device according to claim 7, the third field of the output of the second table also to establish a control signal for the first multiplexer.

9. A network-processing device according to claim 8, the second table to include at least one entry to provide a value to the third field to enable the first multiplexer to select the first field of the plurality.

10. A network-processing device according to claim 9, in which the at least one entry of the second table to provide a next-hop data value to the first field of the plurality.

11. A network-processing device according to claim 10, in which the second table comprises at least another entry to provide a value for the third field to enable the first multiplexer to select the output of the third table.

12. A network-processing device according to claim 7, in which
    the second multiplexer is to select from the at least two subportions dependent upon a control signal; and
    the network-processing device further comprises:
        a modulo processor to output a control signal to the second multiplexer dependent upon a hash input and a count input;
        the count input to receive a count value from the third field; and
        the hash input to receive a hash value based upon header information of the received data.

13. A network-processing device according to claim 12, the second field of the plurality comprising M subportions;
    the second table to include entries of a first plurality having count values n to be output to the third field of the plurality of fields dependent upon indexing by pointers of the content addressable memory; and
    the entries of the first plurality of the second table including values for at least n subportions of the M subportions.

14. A network-processing device according to claim 13, in which n is less than (M+1).

15. A network-processing device according to claim 1, in which
    the second table output includes a third field;
    the third field to establish a control signal; and
    the multiplexer to select from amongst the plurality of next-hop data sources dependent upon the control signal established by the third field.

16. A network-processing device comprising:
    a first table having a plurality of selectable pointers and an output to present a selected pointer of the plurality;
    a second table configured to be indexed by the selected pointer of the first table, the second table comprising a plurality of selectable entries to be output when designated by the pointer output of the first table;
    a link aggregation (LAG) circuit operable to define a next-hop pointer based upon a first output of the second table;
    a next-hop table comprising a plurality of selectable entries with next-hop port ID's; and
    a multiplexer to select a next-hop pointer to index the next-hop table from one of the LAG circuit or a second output of the second table.

17. A network-processing device according to claim 16, in which the second table comprises a plurality of output fields, the output fields including a control-field, the entries of a first plurality of the second table comprise first data for the control-field, the entries of a second plurality of the second table comprise second data for the control-field;
    the multiplexer selection to depend upon data in the control field of the output of the second table.

18. A network-processing device according to claim 17, in which the LAG circuit comprises:
   a LAG table to provide a plurality of entries comprising LAG-size values indexed by LAG-ID values;
   each entry of the first plurality of the second table having a pointer-field comprising a LAG-ID value for indexing the LAG table;
   the LAG table to output a LAG-size value dependent on the LAG-ID value in the pointer-field output of the second table; and
   distribution circuit to establish an output value of magnitude up to the LAG-size value;
   the output of the distribution circuit combined with the pointer-field of the second table output to establish and present a next-hop pointer to a selectable first input of the multiplexer.

19. A network-processing device according to claim 18, in which the pointer-field portion of the second table output establishes the most significant bits for the next-hop pointer for the selectable first input of the multiplexer and the output of the distribution circuit the least significant bits.

20. A network-processing device according to claim 18, in which the distribution circuit comprises:
   a mod processor to provide the output value up to the LAG-size value by using one of either a mod or modulo operator to operate upon a HASH value with a LAG-length value, the LAG-length determined from the LAG-size value output from the LAG table, and the HASH value to be determined from a header of data received by the network processing device.

21. A network-processing device according to claim 20, in which the distribution circuit further comprises an incrementor to receive and increment the LAG-size value from the LAG table to provide the LAG-length value.

22. A network-processing device according to claim 20, further comprising a data processor to identify a header of the received data, and present an index to the first table dependent upon a destination address of the header.

23. A network-processing device according to claim 22, in which the data processor is to provide the HASH value to the mod processor dependent upon the identified header.

24. A network-processing device according to claim 16, in which the second table comprises a SRAM.

25. A network-processing device according to claim 24, in which the entries of the SRAM comprise first, second and third data fields;
   the first data field of at least the first plurality of entries comprising LAG-values to be used by the LAG circuit in generating the next-hop pointer;
   the second data field of at least the second plurality of entries comprising next-hop pointer values to index the next-hop table; and
   the third data field of at least the first and second plurality of entries comprising control data to establish respective selections of the multiplexer.

26. A network-processing device according to claim 25, in which the bits for the first data field of the output of the SRAM over-lap a portion of the second data field.

27. A network-processing device according to claim 26, in which the first data field comprises the least significant bits of the second data field.

28. A network-processing device according to claim 25, the second table further comprising at least one selectable entry comprising a next-hop port-ID value to be used directly by the network-processing device for designating an egress port for a next-hop data transfer.

29. A network-processing device according to claim 28, the SRAM further comprises a fourth data field comprising the at least one next-hop port-ID value to be used directly for designating the egress port.

30. A network-processing device according to claim 29, further comprising a second multiplexer to select one of the fourth data field from the output of the SRAM or the output from the next-hop table to obtain the port ID value for designating the select egress port.

31. A multiple-link network-processing device for routing data, comprising:
   a data processor to receive data and determine content information thereof;
   a content addressable memory having a plurality of pointers to be output dependent upon content information determined by the data processor;
   a second table comprising a plurality of selectable entries to be output dependent upon the pointers output by the content addressable memory;
   the second table output comprising a plurality of data fields;
   a first data field of the plurality comprising a plurality of sub-fields;
   at least a first plurality of the selectable entries of the second table comprising ID values for at least one sub-field of the first data field; and
   a multiplexer to select one of the sub-fields of the first data field of the output of the second table to obtain an ID value for establishing an egress port for transfer of the received data.

32. A multiple-link network-processing device according to claim 31, further comprising a next-hop table comprising a plurality of selectable entries having port identifications to be output when selectively indexed by a pointer value provided by the multiplexer's output.

33. A multiple-link network-processing device according to claim 32, in which a second data field of at least a portion of the selectable entries of the second table comprise control values; and
   the multiplexer selection dependent upon the control value in the second data field of the output of second table.

34. A multiple-link network-processing device according to claim 33, in which the multiplexer comprises M inputs coupled to M sub-fields of the first-field of the output of the second table; and
   the control values for the second data field of at least the portion of the selectable entries of the second table comprise integer count values from 1 to N, wherein N is a value up to M;
   the multiple link network device further comprising a distribution circuit to establish a control signal to enable the multiplexer to select from one of 1 to N inputs of its M inputs when N is not equal to zero.

35. A multiple-link network-processing device according to claim 34, in which the distribution circuit comprises a mod processor operable to provide the control signal of value up to N by performing one of either a mod or modulo operation of a HASH value acted upon by the count value N plus one, the data processor to provide the HASH value based upon a header of the received data.

36. A multiple-link network-processing device according to claim 34, in which the data processor is to examine content information of a header of the received data to determine one of a Forwarding Equivalent Class (FEC) or Quality of Service (QS) for identifying a given flow.

37. A multiple-link network-processing device according to claim 34, in which the data processor is to keep the HASH value fixed for a given identified flow.

38. A multiple-link network-processing device according to claim according to claim 34, further comprising a link aggregation (LAG) circuit operable to define a next-hop pointer based upon at least a portion of the output of the multiplexer.

39. A multiple-link network-processing device according to claim 38, in which the LAG circuit comprises:
  a LAG-size table indexed by at least the portion of the multiplexer output;
  the LAG-size table comprising a plurality of selectable entries with LAG-size values to be output when selected by respective LAG-ID pointers as established via the portion of the multiplexer output; and
  a second distribution circuit to establish a LAG value of magnitude up to the LAG-size value provided by the LAG-size table;
  the LAG value to define at least the least-significant-bits of the next-hop pointer.

40. A multiple-link network-processing device according to claim 39, in which the portion of the output of the multiplexer to index the LAG-size table is to be combined with the LAG value provided by the LAG-size table for defining the next-hop pointer.

41. A multiple-link network-processing device according to claim 40, in which the portion of the output of the multiplexer is to define the most significant bits of the next-hop pointer and the output of the second distribution circuit the least-significant-bits of the next-hop pointer.

42. A multiple-link network-processing device according to claim 41, in which the second distribution circuit comprises a mod processor to establish the LAG value per one of a mod or module operation of a HASH value using a LAG length as the mod divisor, the LAG length related to the LAG size value provided by the LAG-size table, the data processor to provide the HASH value to the mod processor based upon header information of the received data.

43. A multiple-link network-processing device according to claim 42, in which the LAG circuit further comprises an incrementor to increment the LAG-size value provided by the LAG-size table to provide the LAG length to the mod processor.

44. A multiple-link network-processing device according to claim 41, further comprising a second multiplexer to output a select next-hop pointer to index the next-hop table, the second multiplexer to make its selection from at least first and second inputs, the first input to receive the next-hop pointer of the output of the LAG circuit and the second input coupled to the output of the first multiplexer.

45. A multiple-link network-processing device according to claim 44, in which the second multiplexer is to receive a control signal related to the value of the output of the first multiplexer.

46. A multiple-link network-processing device according to claim 45, in which the most significant bits of the output of the first multiplexer determine the control signal of the second multiplexer.

47. A multiple-link network-processing device according to claim 46, in which bits other than the most significant bits of the output of the first multiplexer provide the portion to index the LAG size table.

48. A multiple-link network-processing device according to claim 44, further comprising a third multiplexer to select one of at least first and second inputs from which to obtain an output port identification for identifying the egress port, the first input of the third multiplexer coupled to receive the port identification of the output of the next-hop table and the second input of the third multiplexer coupled to receive data from a third field of the output of the second table.

49. A multiple-link network-processing device according to claim 48, in which the third data field of at least another portion of the selectable entries of the second table comprises port identification values for identifying, when selected per indexing by the pointers of the output of the content addressable memory, an egress port for transfer of the received data.

50. A multiple-link network-processing device according to claim 49, in which the third multiplexer selection is to be determined by the control value of the second data field of the output of the second table.

51. A multiple-link network-processing device according to claim 50, in which the at least another portion of the selectable entries of the second table comprise a count value of zero for the second data field and the third multiplexer to select the second input when zero is the count value of the second data field of the output of the second table.

52. A multiple link network-processing device according to claim 31, further comprising data handling circuitry to transfer the received data to the designated egress port using a protocol procedure of the group consisting of MPLS, IP Switching, Cell Switching, Tag Switching and Aggregate Route-Based IP Switching protocols.

53. A network processing device comprising:
  a first table having a plurality of indexed pointers for selectable output;
  a second table to be indexed by a pointer output of the first table, the second table comprising:
    a plurality of entries for selective output, and
      a plurality of output fields to present respective bit-fields of a selected entry of the plurality;
    a first selection circuit to select an output field of the plurality of output fields of the second table from which to obtain a second pointer;
  a third table to be indexed by the second pointer established by the first selection circuit, the third table comprising:
    a plurality of entries for selective output, and
      a plurality of output fields to present respective bit-fields of a selected entry of the plurality;
    a second selection circuit to select an output field of the plurality of output fields of the third table from which to obtain a third pointer; and
  egress port look-up circuitry to establish an egress port identification based upon the third pointer selected by the second selection circuit.

54. A network processing device according to claim 53, in which the first selection circuit comprises:
  a distribution circuit to receive a count-value and a hash value and provide a selection signal based upon at least one of a mod or modulo operation of the hash value acted upon by the count value as the mod divisor; and
  a multiplexer having multiple inputs coupled to output fields of the plurality of output fields of the second table;
  the multiplexer selecting an output field of the plurality dependent upon the selection signal provided by the distribution circuit.

55. A network processing device according to claim 54, in which the second selection circuit comprises:
  a distribution circuit to receive a second count-value and a second hash value and provide a selection signal based upon at least one of a mod or modulo operation of the second hash value acted upon by the second count value as the mod divisor; and a multiplexer having multiple inputs coupled to output fields of the plurality of output fields of the third table; the multiplexer selecting an output field of the plurality dependent upon the selection signal provided by the distribution circuit.

56. A network processing device according to claim 55, in which the count value for the first selection circuit is obtained from an output field of the plurality of output fields of the second table.

57. A network processing device according to claim 56, in which the count value for the second selection circuit is obtained from an output field of the plurality of output fields of the third table.

58. A network processing device according to claim 57, further comprising a processor to determine header information of a received data packet, establish a pointer for the first table based upon a destination address of the header information, and establish hash values for the distribution circuits of the first and second selection circuits based upon the header information.

59. A network processing device according to claim 58, in which the plurality of outputs of the second table comprises a count output to present the count-value to the modulo circuit of the first selection circuit.

60. A network processing device according to claim 59, in which the processor is further to establish a second hash value for the distribution circuit of the second selection circuit based upon the header information.

61. A network processing device according to claim 60, the processor to establish the second hash value by a bit rotation of the first hash value.

62. A network processing device according to claim 59, in which the plurality of outputs of the third table comprises a count output to present the count-value to the modulo circuit of the second selection circuit.

63. A network processing device according to claim 58, in which the egress port look-up circuitry comprises:
a LAG distribution circuit to select one of a plurality of LAG egress-port identifications by which to designate a select egress-port, the selection based upon a LAG ID and a LAG hash value; and
LAG identification circuitry to establish the LAG ID for the LAG distribution circuit based upon one of the output fields of the third table;
the processor to provide the LAG hash value based upon the header information of the received data packet.

64. A network processing device according to claim 63, in which the LAG identification circuitry comprises:
a next-hop table to be indexed by the output of the second selection circuitry, the next-hop table comprising a plurality of entries including LAG ID values and an output for presenting a selected LAG ID value; and
a multiplexer to select the next-hop LAG ID from one of the output of the next hop table and an output field of the plurality of output fields of the third table, the next hop LAG ID selected by the multiplexer to provide the LAG ID for the LAG distribution circuit.

65. A network processing device according to claim 64, in which the LAG identification circuitry further comprises multiplexing to alternatively obtain the select LAG ID from an output field of the plurality of output fields of the second table as an alternative direct LAG ID.

66. A network processing device according to claim 65, in which the next-hop table of the LAG identification circuitry further comprises another plurality of entries having egress-port ID values for selective output, the network processing device further comprising an output multiplexer to select a next hop egress-port identification from the group consisting of the egress-port ID value output of the LAG-distribution circuit and the select egress-port ID value output of the next hop table.

67. A network processing device according to claim 66, in which the output multiplexer further comprises additional multiplexing to enable alternative selection of the next hop egress-port identification from an egress port ID value output field from the plurality of output fields of the third table.

68. A network processing device according to claim 67, in which the output multiplexer further comprises additional multiplexing to alternatively select the next hop egress-port identification from an egress port ID value output field from the plurality of output fields of the second table.

69. A network processing device according to claim 68, in which the output multiplexer selection to depend on at least one of the group of:
the count values of the first and second distribution circuits of the respective first and second selection circuits;
enablement of the LAG distribution circuitry to provide an egress-port ID value; and
enablement of the next hop table of the LAG ID circuitry to provide a LAG ID for the LAG distribution circuitry.

70. A network processing device according to claim 64, in which the LAG distribution circuit further comprises:
a LAG egress port table comprising a plurality of egress-port ID's for selectable output; and
a LAG address calculation circuit to determine a pointer by which to index the LAG egress port table, the address calculation to be based upon the next-hop LAG ID selected by the multiplexer of the LAG identification circuitry and a LAG hash value;
the processor further to establish the LAG hash value based upon the header information of the received data packet.

71. A network processing device according to claim 70, in which the LAG address calculation circuit comprises:
a LAG size table to receive the next-hop LAG ID and output a LAG size value dependent on the received LAG ID;
distribution circuit to determine an output value of magnitude up to the LAG size value, the output value based upon the LAG hash value; and
merger circuit to merge the output of the distribution circuit with the LAG ID to provide the pointer for indexing the LAG egress port table.

72. A network processing device according to claim 71, in which the distribution circuit of the LAG address calculation circuit comprises a mod processor to provide its output value by performing one of a mod or modulo operation of the hash value acted upon by the LAG size as the mod divisor.

* * * * *